US011312051B2

(12) United States Patent
Boxwala

(10) Patent No.: US 11,312,051 B2
(45) Date of Patent: Apr. 26, 2022

(54) STEM CONNECTOR FOR MELT-DISTRIBUTION ASSEMBLY OF MOLDING SYSTEM

(71) Applicant: Hakimuddin Boxwala, Mississauga (CA)

(72) Inventor: Hakimuddin Boxwala, Mississauga (CA)

( * ) Notice: Subject to any disclaimer, the term of this patent is extended or adjusted under 35 U.S.C. 154(b) by 650 days.

(21) Appl. No.: 16/193,602

(22) Filed: Nov. 16, 2018

(65) Prior Publication Data

US 2020/0156297 A1    May 21, 2020

(51) Int. Cl.
*B29C 45/27* (2006.01)
*B29C 45/26* (2006.01)

(52) U.S. Cl.
CPC .. *B29C 45/2725* (2013.01); *B29C 2045/2683* (2013.01)

(58) Field of Classification Search
CPC ............. B29C 45/2725; B29C 2045/2683
See application file for complete search history.

(56) References Cited

U.S. PATENT DOCUMENTS

| 7,131,834 B2 | 11/2006 | Babin et al. |
| 7,931,455 B2 | 4/2011 | Tabassi |
| 8,100,689 B2 | 1/2012 | Bouti et al. |
| 8,282,870 B2 | 10/2012 | Bouti et al. |
| 8,308,476 B2 | 11/2012 | Tabassi et al. |
| 9,358,713 B2 | 6/2016 | Olaru |
| 2012/0231111 A1* | 9/2012 | Catoen ............... B29C 45/2806 425/562 |
| 2013/0287887 A1* | 10/2013 | Keir ...................... B29C 45/23 425/562 |
| 2015/0151473 A1* | 6/2015 | Olaru .................. B29C 45/232 264/328.1 |
| 2017/0190088 A1* | 7/2017 | Hall .................... B29C 45/281 |

FOREIGN PATENT DOCUMENTS

WO        2013032622        3/2013

* cited by examiner

*Primary Examiner* — Leith S Shafi
*Assistant Examiner* — Inja Song
(74) *Attorney, Agent, or Firm* — Aird & McBurney LP

(57) ABSTRACT

An apparatus includes a stem connector configured to connect a movable piston with a valve stem, in which the movable piston is slidably receivable in a cylinder, and in which the cylinder is mountable to a distribution manifold of a molding system. The stem connector maintains connection between the movable piston and the valve stem while the valve stem is moved to selectively open or close a mold gate of a mold assembly installed in the molding system. The stem connector urges the movable piston to tilt at a tilt angle while the movable piston is moved along an interior of the cylinder, and in which the tilt angle is formed between a central piston axis extending through the movable piston and a central stem axis extends through the valve stem.

20 Claims, 13 Drawing Sheets

STEM CONNECTOR FOR MELT-DISTRIBUTION ASSEMBLY OF MOLDING SYSTEM

TECHNICAL FIELD

This document relates to the technical field of (and is not limited to) any one or more of (A) a stem connector 116 for installation in a melt-distribution assembly 910 of a molding system 900 (and/or methods associated therewith), (B) a melt-distribution assembly 910 having a stem connector 116 (in which the melt-distribution assembly 910 is for installation in a molding system 900 (and/or methods associated therewith), and/or (C) a molding system 900 including a melt-distribution assembly 910 having a stem connector 116 (and/or methods associated therewith).

BACKGROUND

A molding system utilizes a manufacturing process that includes shaping a flowable material by using a mold assembly. The flowable material may include (and is not limited to) a liquid, a pliable raw material, a plastic material, glass, metal, ceramic, etc., and any equivalent thereof. The mold assembly may include (define) a mold cavity (also called a hollowed-out block) that is fillable with the flowable material. The flowable material hardens or sets inside the mold cavity, and adopts the shape of the mold cavity (thereby forming a molded part or item).

SUMMARY

It will be appreciated that there exists a need to mitigate (at least in part) at least one problem associated with the existing molding systems (also called the existing technology). After much study of the known systems and methods with experimentation, an understanding (at least in part) of the problem and its solution has been identified (at least in part) and is articulated (at least in part) as follows:

From time to time, known stem connectors may result in the undesired wear of adjacently-located surfaces of a component (adjacently-contacting surfaces of a component) once the known stem connectors operate in known melt-distribution assemblies. This situation may result in lost production time, increased manufacturing and/or labor costs, increased repair costs, increased maintenance costs (to prevent occurrences of potential malfunctions), and/or decreased product quality as a result of under-filled mold cavities, etc. Known stem connectors are utilized for connecting known valve stems to known movable piston assemblies. In response to actuated movement of the known movable piston assembly, the valve stem is moved to selectively open and close a molding nozzle. The molding nozzle is used to inject the flowable molding material into the mold cavity. The known valve stem is moved by the known piston assembly, and as a result of such movement, there is a degree of undesired friction between the outer surface of the known valve stem and adjacently located surfaces of parts and/or assemblies (which leads to undesired wear of components). Once the components wear, the operating parameters of the known molding system become less predictable or less controllable (and this situation may lead to lower quality of molded parts, or part-to-part variations in weight, etc.).

It may be desirable or advantageous to permit the movement of the known valve stem while reducing the possibility of the undesired friction (preferably for as long as possible). It may be desirable or advantageous to delay the onset of undesired wear between the sliding surfaces of the known valve stem and the adjacently-located parts (adjacently-contacting surfaces, or contacting at least in part, etc.) and/or assemblies. It may be desirable or advantageous to take into account the relationship (or the connection) between the known valve stem and the known movable piston in order to reduce the premature onset of the undesired friction as identified above. It may be desirable or advantageous to adjust the connection that is made between the known valve stem and the known movable piston, in order to reduce the friction between the sliding surfaces of the known valve stem and adjacently-located parts (adjacently-contacting surfaces) and/or assemblies (which may reduce undesired wear). The adjustment of the connection may be made, for instance, from time to time, such as before or after operation of the molding system, etc. It may be desirable or advantageous to have a stem connector that facilitates the adjustment (readjustment) of the connection that is made between the known valve stem and the known movable piston (so that the reduction of friction and/or wear between the sliding surfaces may be achieved).

To mitigate, at least in part, at least one problem associated with the existing technology, there is provided (in accordance with a major aspect) an apparatus. The apparatus includes and is not limited to a stem connector configured to connect a movable piston and a valve stem (with each other). The movable piston is slidably receivable in a cylinder. The cylinder is mountable to a distribution manifold of a molding system. The stem connector maintains connection (the stem connector is configured to maintain connection) between the movable piston and the valve stem while the valve stem is moved to selectively open or close a mold gate of a mold assembly installed in the molding system. The stem connector urges (positions or orients) the movable piston to tilt at a tilt angle while the movable piston is moved along an interior of the cylinder, and in which the tilt angle is formed between a central piston axis extending through the movable piston and a central stem axis extending through the valve stem.

To mitigate, at least in part, at least one problem associated with the existing technology, there is provided (in accordance with a major aspect) an apparatus. The apparatus includes and is not limited to (comprises) a stem connector mountable to an interior of a movable piston. The stem connector is for connecting the movable piston with (and) a first end portion of a valve stem. The valve stem is receivable in a stem receiver of the movable piston. The movable piston is slidably receivable in the interior of a cylinder. The movable piston is movable within the interior of a cylinder in response to an application of an activation force acting on the movable piston. The movable piston provides (defines) the stem receiver. The cylinder is mountable to a manifold exterior of a distribution manifold. The melt-distribution assembly includes a mold gate. The melt-distribution assembly is for installation in a molding system. The melt-distribution assembly includes a distribution manifold. The valve stem has the first end portion slidably insertable, at least in part, into the stem receiver of the movable piston. The valve stem extends from the movable piston once the first end portion of the valve stem is inserted into the stem receiver. The valve stem has a second end portion slidably insertable, at least in part, in (into) the mold gate of the melt-distribution assembly. The second end portion of the valve stem is sized to close the mold gate once the valve stem is slidably inserted, at least in part, in (into) the mold gate. The second end portion of the valve stem is sized to open the mold gate once the valve stem is slidably removed from the mold gate. The stem connector maintains connection (the stem connector is configured to maintain connection) between the movable piston and the first end portion of the valve stem while the valve stem is moved to selectively open or close the mold gate in response to the movable piston selectively receiving the activation force. The stem connector urges (positions or orients) the movable piston to tilt at a tilt angle while the movable piston is moved along the interior of the cylinder, and in which the tilt angle is formed between a central piston axis extending through the movable piston and a central stem axis extending through the valve stem.

To mitigate, at least in part, at least one problem associated with the existing technology, there is provided (in accordance with a major aspect) an apparatus. The apparatus includes and is not limited to (comprises) a melt-distribution assembly for installation in a molding system. The melt-distribution assembly, includes (and is not limited to) a distribution manifold. A cylinder has an interior (a cylinder interior). The cylinder is mounted to a manifold exterior of the distribution manifold. The melt-distribution assembly includes a mold gate. A movable piston is slidably receivable in the interior of the cylinder. The movable piston is movable within the interior of the cylinder in response to an application of an activation force acting on the movable piston. The movable piston defines a stem receiver. A valve stem has a first end portion slidably inserted into the stem receiver of the movable piston. The valve stem extends from the movable piston once the first end portion of the valve stem is inserted into the stem receiver. The valve stem has a second end portion slidably insertable, at least in part, in (into) the mold gate of the melt-distribution assembly. The second end portion of the valve stem is sized to close the mold gate once the valve stem is slidably inserted, at least in part, in (into) the mold gate. The second end portion of the valve stem is sized to open the mold gate once the valve stem is slidably removed from the mold gate. The stem connector is mounted to an interior of the movable piston. The stem connector is for connecting the movable piston with (and) the first end portion of the valve stem (with each other). The valve stem is received in the stem receiver of the movable piston. The stem connector maintains connection (the stem connector is configured to maintain connection) between the movable piston and the first end portion of the valve stem while the valve stem is moved to selectively open or close the mold gate in response to the movable piston selectively receiving the activation force. The stem connector urges (positions or orients) the movable piston to tilt at a tilt angle while the movable piston is moved along the interior of the cylinder. The tilt angle is formed between a central piston axis extending through the movable piston and a central stem axis extending through the valve stem.

To mitigate, at least in part, at least one problem associated with the existing technology, there is provided (in accordance with a major aspect) an apparatus. The apparatus includes and is not limited to (comprises) a molding system. The molding system includes and is not limited to (comprises) an injection assembly for preparing and providing a flowable molding material. A clamp assembly is spaced apart from the injection assembly. The clamp assembly includes a first platen. The clamp assembly includes a second platen. The first platen and the second platen are movable relative to each other. A melt-distribution assembly is securely mounted to the first platen of the clamp assembly of the molding system. The melt-distribution assembly includes (and is not limited to) a distribution manifold providing (A) a sprue for fluidly receiving the flowable molding material from the injection assembly, and (B) a melt-distribution channel fluidly extending from the sprue. A mold assembly provides a mold gate for fluidly communicating with the melt-distribution channel. The mold assembly also provides a mold cavity for receiving the flowable molding material from the mold gate via the melt-distribution channel of the melt-distribution assembly. The mold assembly has a first mold section securely mounted to the melt-distribution assembly. The mold assembly also has a second mold section securely mounted to the second platen of the clamp assembly. The first mold section and the second mold section are movable relative to each other in response to relative movement between the first platen and the second platen. The melt-distribution assembly also includes and is not limited to (comprises) a cylinder which has an interior. The cylinder is mounted to a manifold exterior of the distribution manifold. A movable piston is slidably receivable in the interior of the cylinder. The movable piston is movable within the interior of the cylinder in response to an application of an activation force acting on the movable piston. The movable piston defines a stem receiver. A valve stem has a first end portion slidably inserted into the stem receiver of the movable piston. The valve stem extends from the movable piston once the first end portion of the valve stem is inserted into the stem receiver. The valve stem has a second end portion slidably insertable, at least in part, in (into) the mold gate of the melt-distribution assembly. The second end portion of the valve stem is sized to close the mold gate once the valve stem is slidably inserted, at least in part, in (into) the mold gate. The second end portion of the valve stem is sized to open the mold gate once the valve stem is slidably removed from the mold gate. A stem connector is mounted to an interior of the movable piston. The stem connector is for connecting the movable piston with (and) the first end portion of the valve stem. The valve stem is received in the stem receiver of the movable piston. The stem connector maintains connection (the stem connector is configured to maintain connection) between the movable piston with (and) the first end portion of the valve stem while the valve stem is moved to selectively open or close the mold gate in response to the movable piston selectively receiving the activation force. The stem connector urges (positions or orients) the movable piston to tilt at a tilt angle while the movable piston is moved along the interior of the cylinder, and in which the tilt angle is formed between a central piston axis extending through the movable piston and a central stem axis extending through the valve stem.

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in simplified form that are further described below in the Detailed Description. This Summary is not intended to identify potentially key features or possible essential features of the disclosed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which.

Figure 1:
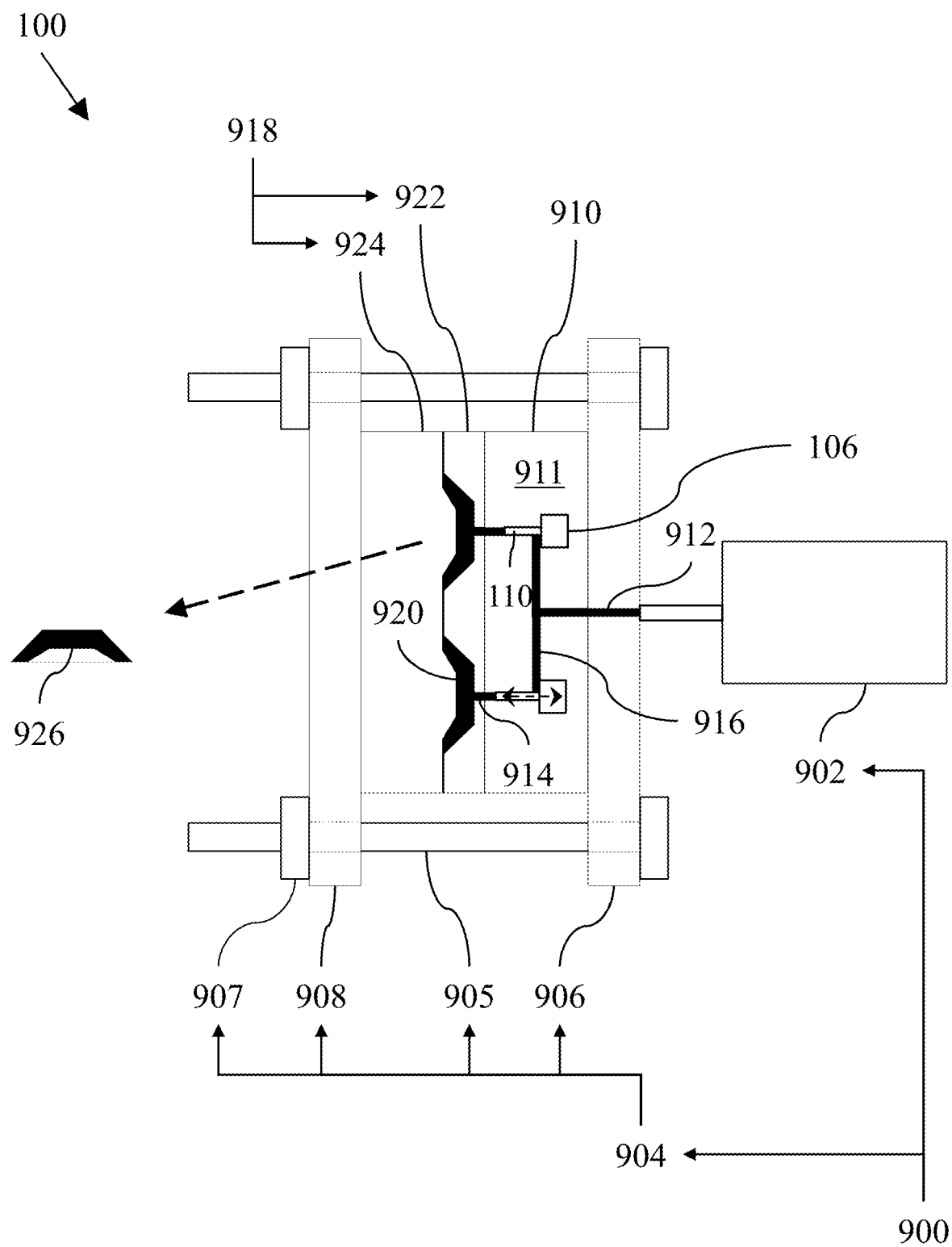
FIG. 1 depicts a schematic view of an embodiment of a molding system including a melt-distribution assembly having a movable piston (in which the movable piston is usable with a stem connector as depicted in the embodiments of FIG. 3 to FIG. 17)

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, and well-understood, elements that are useful in commercially feasible embodiments are often not depicted to provide a less obstructed view of the embodiments of the present disclosure.

LISTING OF REFERENCE NUMERALS USED IN THE DRAWINGS 100 apparatus
102 cylinder
103 inner surface
105 central piston axis
106 movable piston
107 activation force
108 stem receiver
109 connector receiver
110 valve stem
111 central stem axis
112 first end portion
113 tilt angle
114 second end portion
115 outer stem surface
116 stem connector
118 nozzle -continued 122 bushing channel
124 stem bushing
125 inner bushing surface
126 stem channel
128 stem-bushing gap
130 seal assembly
132 seal receiver
134 ball
136 biasing device
138 housing assembly
140 threads
141 chamfered circumferential edge
142 threads
144 tool
146 linear direction
148 rotation direction
150 stem groove
152 air portal
154 connector axis
156 connector direction
158 cylinder direction
160 molding-material flow direction
162 piston-cylinder gap
164 piston alignment plane
166 bushing alignment plane
168 fluid-flow direction
170 rotation direction
172 stem-piston gap
176 first insertion direction
178 second direction
180 bushing-manifold gap
182 cylinder receiver
184 stem direction
900 molding system
902 injection assembly
904 clamp assembly
905 rod assembly
906 first platen
907 lock assembly
908 second platen
910 melt-distribution assembly
911 distribution manifold
912 sprue
914 mold gate
916 melt-distribution channel
918 mold assembly
920 mold cavity
922 first mold section
924 second mold section
926 molded part

DETAILED DESCRIPTION OF THE EXEMPLARY EMBODIMENTS

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the claim is defined by the claims (in which the claims may be amended during patent examination after the filing of this application). For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described. It will be appreciated that the scope of the meaning of a device configured to be coupled to an item (that is, to be connected to, to interact with the item, etc.) is to be interpreted as the device being configured to be coupled to the item, either directly or indirectly. Therefore, "configured to" may include the meaning "either directly or indirectly" unless specifically stated otherwise.

FIG. 1 depicts a schematic view of an embodiment of a molding system 900 including a melt-distribution assembly 910 having a movable piston 106 (in which the movable piston 106 is usable with a stem connector 116 as depicted in the embodiments of FIG. 3 to FIG. 17).

Referring to the embodiment as depicted in FIG. 1, the apparatus 100 includes and is not limited to (comprises) a molding system 900. The molding system 900 may be called an injection molding machine, also known as an injection press, etc., and any equivalent thereof. The molding system 900 is a machine configured to manufacture a product (such as, a plastic product) by an injection molding process. Generally, the molding system 900 includes an injection assembly 902 (sometimes called an injection unit) and a clamp assembly 904 (sometimes called a clamping unit). The molding system 900 may be horizontally oriented, and may be vertically aligned (to allow the advantage of gravity for the molding process). The molding system 900 may include any type of driving system, such as hydraulic, mechanical, electrical, pneumatic, or hybrid.

Referring to the embodiment as depicted in FIG. 1, a mold assembly 918 may be fastened in either a horizontal or vertical position in the molding system 900. The mold assembly 918 may be utilized with a cold runner system or a hot runner system to carry the plastic and fillers from the injection assembly 902 to the interior of the mold assembly 918. A cold runner may include a channel carved into the mold assembly 918. The plastic that fills the cold runner cools as the part cools and is then ejected with the part. A hot runner system is more complicated, often using cartridge heaters to keep the plastic in the runners hot as the part cools (in the mold assembly 918). After the part is ejected, the plastic remaining in a hot runner is injected into the next part to be molded in the mold assembly 918. A robotic arm (known and not depicted) may be utilized to remove the molded part 926 from the mold assembly 918.

Referring to the embodiment as depicted in FIG. 1, the molding system 900 includes and is not limited to (comprises) a synergistic combination of an injection assembly 902 and a clamp assembly 904. Preferably, a melt-distribution assembly 910 is provided separately from, and then combined with, the molding system 900. Preferably, a mold assembly 918 is provided separately from, and then combined with, the molding system 900. The melt-distribution assembly 910 and the mold assembly 918 are configured (designed) for molding specific parts with cooperation from the injection assembly 902 and the clamp assembly 904 (once the melt-distribution assembly 910 and the mold assembly 918 are installed to the clamp assembly 904).

Referring to the embodiment as depicted in FIG. 1, the injection assembly 902 is for preparing and providing a flowable molding material (flowable material, plastic, metal, etc.). The flowable molding material is to be injected into the interior (cavity) of the mold assembly 918. The clamp assembly 904 is spaced apart from the injection assembly 902. The clamp assembly 904 includes a first platen 906. The first platen 906 may include, for instance, (or is called) a stationary platen. The clamp assembly 904 also includes a second platen 908. The second platen 908 may include, for instance, (or is called) a movable platen assembly. The first platen 906 and the second platen 908 are movable relative to each other. The second platen 908 is movable relative to the first platen 906.

Referring to the embodiment as depicted in FIG. 1, the clamp assembly 904 includes a rod assembly 905 that extends between the first platen 906 and the second platen 908. The rod assembly 905 is fixedly attached to the first platen 906. The rod assembly 905 extends through the second platen 908. A lock assembly 907 is configured to selectively lock the rod assembly 905 to the second platen 908 (prior to the insertion of the flowable molding material into the interior (cavity) of the mold assembly 918).

Referring to the embodiment as depicted in FIG. 1, the melt-distribution assembly 910 may include, for instance, (or is called) a runner assembly or a hot runner, etc. The melt-distribution assembly 910 is securely mounted (securely mountable) to the first platen 906 of the clamp assembly 904 of the molding system 900. The melt-distribution assembly 910 faces the second platen 908 once the melt-distribution assembly 910 is securely mounted to the first platen 906. The melt-distribution assembly 910 includes and is not limited to (comprises) a distribution manifold 911. The distribution manifold 911 provides (defines) a sprue 912 for fluidly receiving the flowable molding material from the injection assembly 902. The distribution manifold 911 provides (defines) a melt-distribution channel 916 that fluidly extends (if configured to extend) from the sprue 912.

Referring to the embodiment as depicted in FIG. 1, the distribution manifold 911 provides (conveys) the flowable molding material from the injection assembly 902 to the mold assembly 918. The mold assembly 918 is replaced from time to time when needed on account of wear. The mold assembly 918 provides (defines) a mold gate 914 for fluidly communicating with the melt-distribution channel 916. The mold assembly 918 also provides (defines) a mold cavity 920 for receiving the flowable molding material from the mold gate 914 via the melt-distribution channel 916 of the melt-distribution assembly 910. The mold assembly 918 has a first mold section 922 securely mounted to the melt-distribution assembly 910. The first mold section 922 may include, for instance, (and is also called) a stationary mold section. The mold assembly 918 also has a second mold section 924 (also called a movable mold section) securely mounted to the second platen 908 of the clamp assembly 904. The second mold section 924 may include, for instance, (and is also called) a movable mold section. The first mold section 922 and the second mold section 924 are movable relative to each other in response to relative movement between the first platen 906 and the second platen 908. The mold assembly 918 defines an interior cavity once the first mold section 922 and the second mold section 924 are moved together and abut each other.

Referring to the embodiment as depicted in FIG. 1, the melt-distribution assembly 910 includes (and is not limited to) a movable piston 106 (configured to be slidably mounted to a component of the melt-distribution assembly 910). The melt-distribution assembly 910 also includes a valve stem 110 configured to be connected (coupled) to the movable piston 106. A stem connector 116 is configured to connect the movable piston 106 and the valve stem 110 with each other. The stem connector 116 is not depicted in FIG. 1, and the embodiments of the stem connector 116 are depicted in FIG. 3 to FIG. 17.

Figure 2:
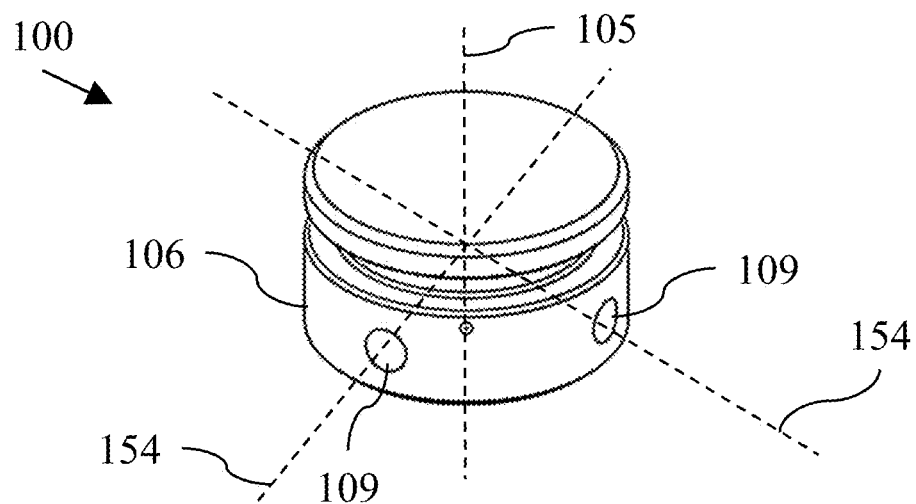
FIG. 2 and FIG. 3 depict a perspective view (FIG. 2) and a top view (FIG. 3) of embodiments of the movable piston of the melt-distribution assembly of FIG. 1.
Figure 3:
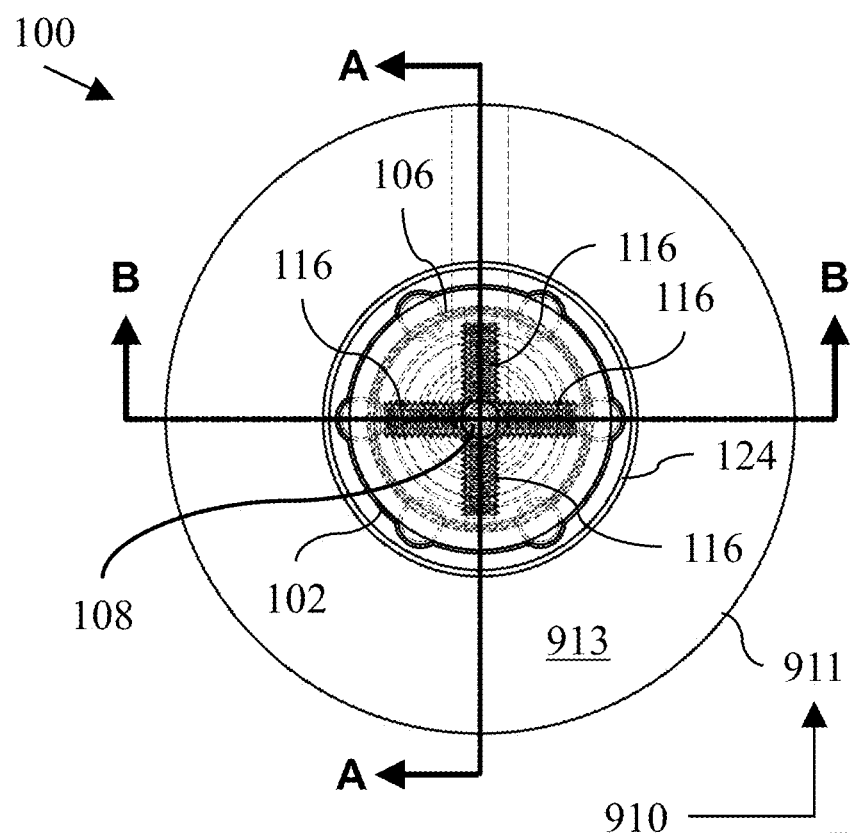

FIG. 2 and FIG. 3 depict a perspective view (FIG. 2) and a top view (FIG. 3) of embodiments of the movable piston 106 of the melt-distribution assembly 910 of FIG. 1.

Referring to the embodiment as depicted in FIG. 2 and FIG. 3, the movable piston 106 has a cylindrical shape. The movable piston 106 includes (defines) a connector receiver 109. The connector receiver 109 is radially aligned relative to (radially extends from) a central piston axis 105 of the movable piston 106. The connector receiver 109 extends radially from the central piston axis 105 of the movable piston 106. The connector receiver 109 extends along a radially extending axis, which is also called a connector axis 154. The central piston axis 105 may be called a central longitudinal axis or a central radial axis. The connector axis 154 may be called a radially-extending connector axis.

Referring to the embodiment as depicted in FIG. 2 and FIG. 3, the connector receiver 109 is configured to receive (receives), at least in part, the stem connector 116. The stem connector 116 is not depicted in FIG. 2, and embodiments of the stem connector 116 are depicted in FIG. 3 to FIG. 17.

Referring to the embodiment as depicted in FIG. 2 and FIG. 3, the connector receiver 109 forms a corresponding shape that corresponds to an exterior shape (elongated shape) of the stem connector 116. Preferably, the connector receiver 109 forms a hollow (elongated) cylindrical shape. The exterior shape of the stem connector 116 is (includes) a cylindrical shape that corresponds to the hollow cylindrical shape of the connector receiver 109. Preferably, a quantity of four (four instances) of the connector receiver 109 are provided by the movable piston 106. Preferably, each instance (occurrence) of the connector receiver 109 is formed, or provided, by the movable piston 106.

Referring to the embodiment as depicted in FIG. 3 to FIG. 17, the stem connector 116 provides at least one or more technical advantages. The stem connector 116 is configured to permit movement of the valve stem 110 along with the movable piston 106 while reducing the possibility of the undesired friction between the outer surface of the valve stem 110 and adjacently-located surfaces (adjacently-contacting surfaces, which may contact at least in part with each other) of other components (preferably, for as long as possible). The stem connector 116 is configured to delay the onset of undesired wear between the sliding surfaces of the valve stem 110 and adjacently-located components and/or assemblies. The stem connector 116 is configured to take into account the relationship (or the connection) between the valve stem 110 and the movable piston 106 in order to reduce the premature onset of the undesired friction. The stem connector 116 is configured to adjust the connection that is made between the valve stem 110 and the movable piston 106, in order to reduce the friction between the sliding surfaces of the valve stem 110 and adjacently-located parts (adjacently-contacting surfaces, which may contact at least in part with each other) and/or assemblies (which may reduce undesired wear). The stem connector 116 is configured to adjust the connection made between the valve stem 110 and the movable piston 106, from time to time, such as before or after operation of the molding system, etc. The stem connector 116 is configured to facilitate the adjustment (readjustment) of the connection that is made between the valve stem 110 and the movable piston 106 (so that the reduction of friction and/or wear between the sliding surfaces may be achieved).

Referring to the embodiment as depicted in FIG. 3, the stem connector 116 includes a first stem connector 116, a second stem connector 116, a third stem connector 116, and a fourth stem connector 116. The movable piston 106 includes a first connector receiver 109 configured to receive the first stem connector 116, a second connector receiver 109 configured to receive the second stem connector 116, a third connector receiver 109 configured to receive the third stem connector 116, and a fourth connector receiver 109 configured to receive the fourth stem connector 116. The first connector receiver 109, the second connector receiver 109, the third connector receiver 109 and the fourth connector receiver 109 each radially extend, at respective angles, from a central piston axis 105 of the movable piston 106.

Referring to the embodiment as depicted in FIG. 3, the movable piston 106 is received in (or housed in) the cylinder 102. The cylinder 102 and the movable piston 106 are positioned over (proximate to) a stem bushing 124. The stem bushing 124 is received or held (or received) by a distribution manifold 911 of the melt-distribution assembly 910. The valve stem 110 extends approximately axially from the movable piston 106 once the stem connector 116 connects the valve stem 110 with the movable piston 106.

Figure 4:
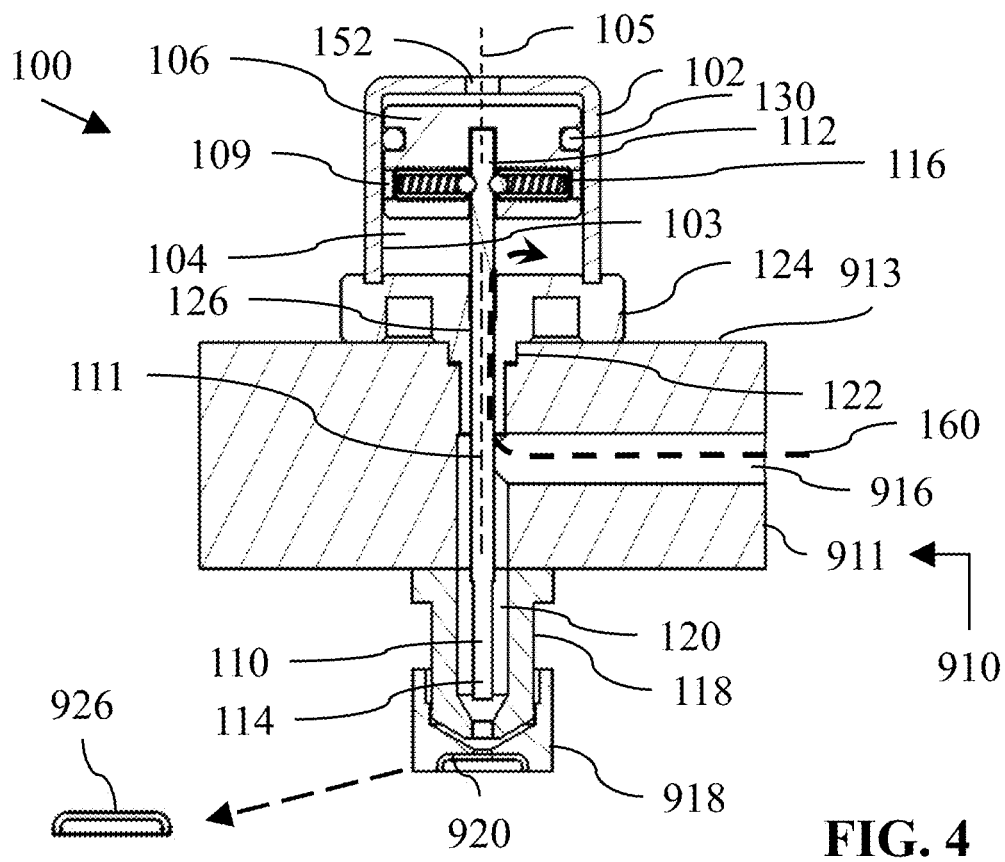
FIG. 4 and FIG. 5 depict cross-sectional views of embodiments of the movable piston of FIG. 3 with a valve stem (in which FIG. 4 depicts a cross-sectional view taken through a cross-sectional line A-A of FIG. 3, and in which FIG. 5 depicts a cross-sectional view taken through a cross-sectional line B-B of FIG. 3)
Figure 5:
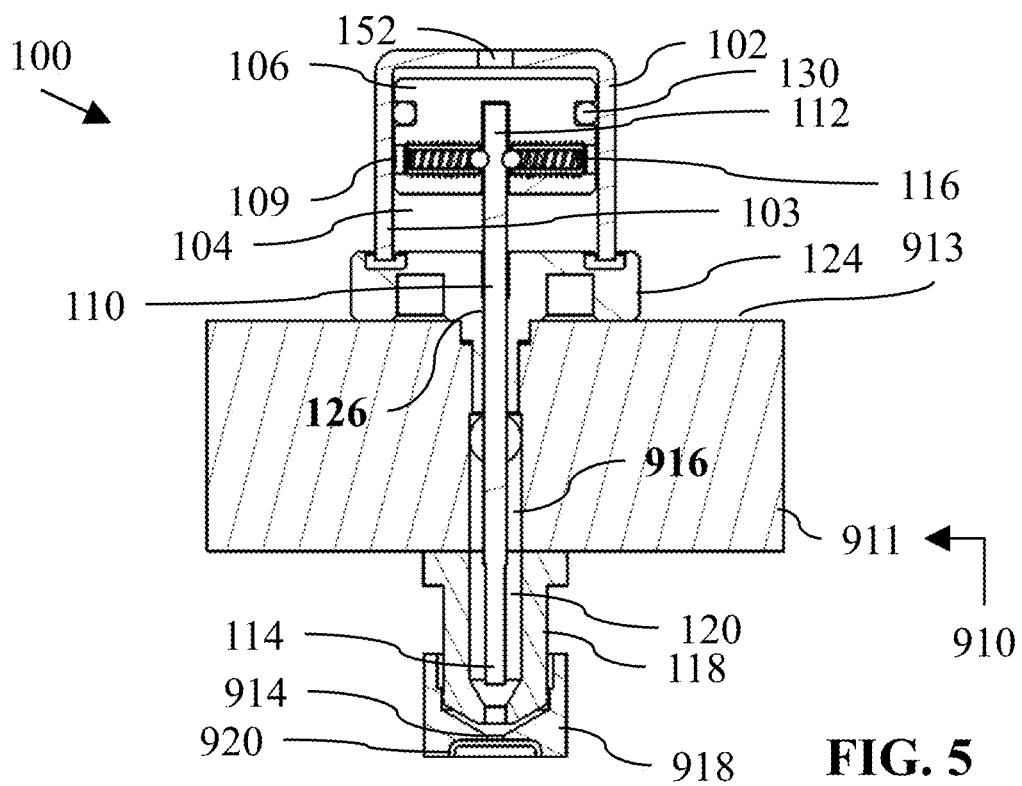

FIG. 4 and FIG. 5 depict cross-sectional views of embodiments of the movable piston 106 of FIG. 3 with a valve stem 110. FIG. 4 depicts a cross-sectional view taken through a cross-sectional line A-A of FIG. 3. FIG. 5 depicts a cross-sectional view taken through a cross-sectional line B-B of FIG. 3.

Referring to the embodiment as depicted in FIG. 4 and FIG. 5, the melt-distribution assembly 910 also includes a nozzle 118 positioned proximate to the mold gate 914. The valve stem 110 extends and is received along an interior 120 of the nozzle 118. The valve stem 110 is reciprocated (stroked or moved downward and upward) to selectively close (by downward movement of the valve stem 110) or open (by upward movement of the valve stem 110) the mold gate 914 in response to reciprocated motion of the movable piston 106. The distribution manifold 911 defines a bushing channel 122. A stem bushing 124 is received along a length of the bushing channel 122. The stem bushing 124 defines a stem channel 126. The valve stem 110 is received along a length of the stem channel 126 of the stem bushing 124.

Referring to the embodiment as depicted in FIG. 4 and FIG. 5, the stem bushing 124 is inserted into a bushing channel 122 provided by (defined by) the distribution manifold 911. The valve stem 110 is inserted into the stem channel 126 (also called a stem receiver) of the stem bushing 124. The valve stem 110 extends into the melt-distribution channel 916 of the distribution manifold 911. The valve stem 110 also extends into a nozzle 118. The stem connector 116 is configured to selectively connect (couple) the movable piston 106 and the valve stem 110 together. The cylinder 102 is positioned over the movable piston 106, and the cylinder 102 is positioned onto the stem bushing 124. The nozzle 118 is in fluid communication with the interior or mold cavity of the mold assembly 918. The movable piston 106 is connected to the valve stem 110 (at a distal end of the valve stem 110). The valve stem 110 is utilized to selectively open and close the mold gate 914 of the mold assembly 918 (so that the flowable molding material may enter into the interior of the mold assembly 918).

Referring to the embodiment as depicted in FIG. 4 and FIG. 5, the movable piston 106 includes a seal assembly 130, which is preferably made of an elastic material or an elastically deformable material, etc. The seal assembly 130 may include an o-ring, and any equivalent thereof. The seal assembly 130 is configured to provide an air tight seal (within an acceptable tolerance) once the movable piston 106 is made to be moved relative to an inner surface 103 (also called an interior lateral side wall) of the cylinder 102.

Referring to the embodiment as depicted in FIG. 4 and FIG. 5, the cylinder 102 defines (provides) an air portal 152 configured to receive a pneumatic pressure (a fluid pressure) into the interior of the cylinder 102. The pneumatic pressure may be utilized for selective urged movement (reciprocated movement) of the movable piston 106 relative to the cylinder 102. It will be appreciated that the preferred embodiment utilizes pneumatic pressure for actuating or urging the reciprocal movement of the cylinder 102, and that other means (such as, electrical actuation, etc.) for reciprocal movement of the cylinder 102 may be utilized (persons of skill in the art will understand this).

Referring to the embodiment as depicted in FIG. 4 and FIG. 5, there is a tight guidance (tight tolerance) between the outer surface of the valve stem 110 and the interior surface surrounding the stem channel 126 of the stem bushing 124. The stem connector 116 is configured to maintain the tight guidance (tight tolerance) between the outer surface of the valve stem 110 and interior surface surrounding the stem channel 126 of the stem bushing 124 (thereby reducing wear between an adjacently-located surfaces, or adjacently-contacting surfaces, which may contact at least in part with each other). The outer surface of the valve stem 110 and the interior surface surrounding the stem channel 126 of the stem bushing 124 are made to move relative to each other once the movable piston 106 is actuated for movement. For the case where the gap between the outer surface of the valve stem 110 and the interior surface surrounding the stem channel 126 of the stem bushing 124 becomes wider, the interior of the cylinder 102 is prone to receiving an amount of wanted molding material from the melt-distribution channel 916 of the distribution manifold 911 via the molding-material flow direction 160. This unwanted leakage of molding material may be removed from the interior of the cylinder 102, which may reduce the operating time of the molding system 900 (depicted in FIG. 1).

Figure 6:
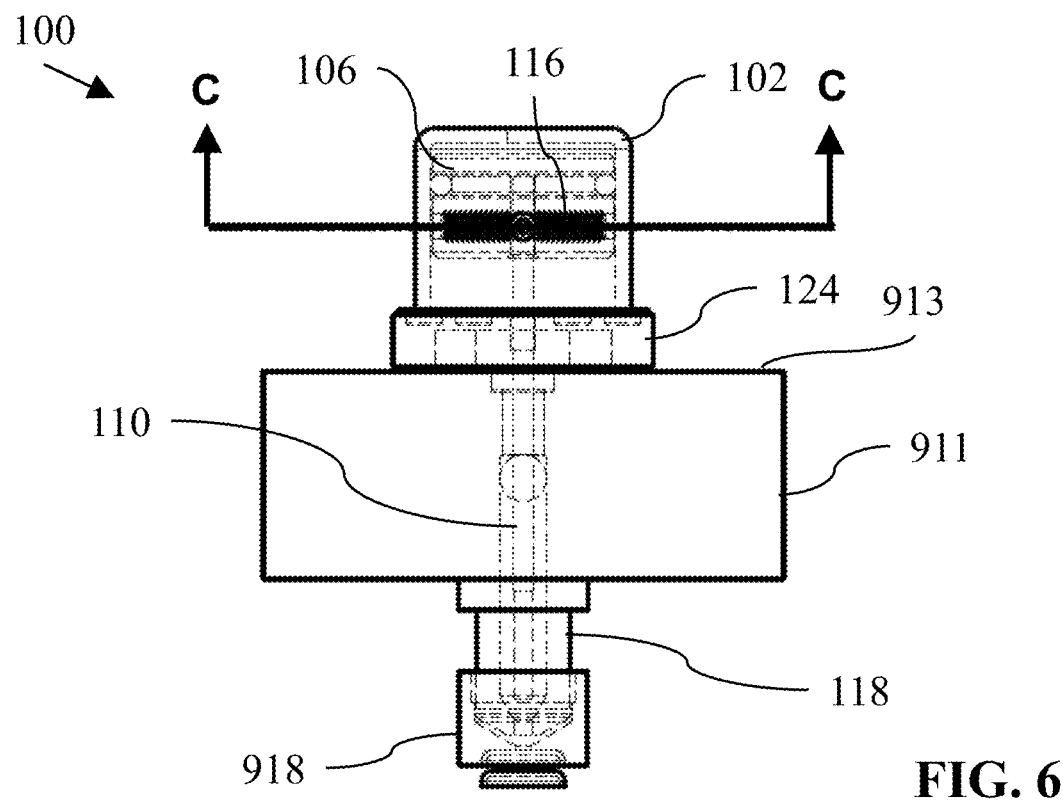
FIG. 6 and FIG. 7 depict a side view (FIG. 6) and a cross-sectional view (FIG. 7) of embodiments of the movable piston of FIG. 2 (in which FIG. 7 depicts a cross-sectional view taken through a cross-sectional line C-C of FIG. 6)
Figure 7:
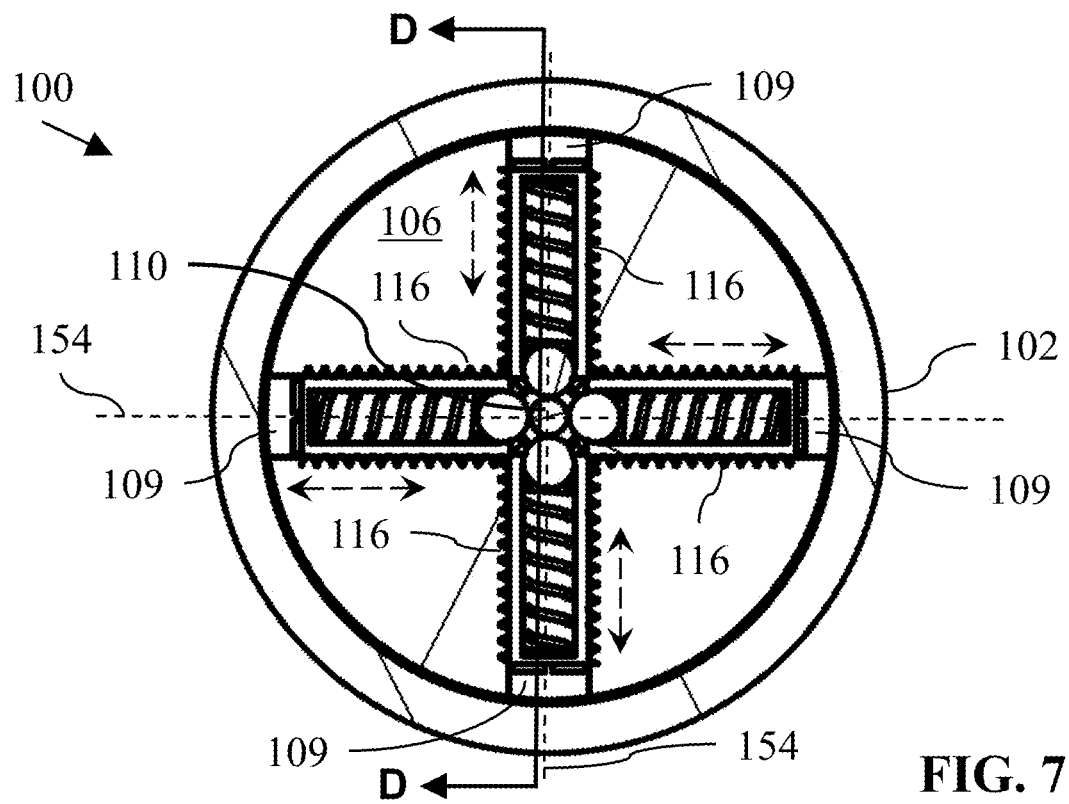

FIG. 6 and FIG. 7 depict a side view (FIG. 6) and a cross-sectional view (FIG. 7) of embodiments of the movable piston 106 of FIG. 2. FIG. 7 depicts a cross-sectional view taken through a cross-sectional line C-C of FIG. 6.

Referring to the embodiment as depicted in FIG. 7, the stem connector 116 is configured to be movable (rotatably movable) along the connector axis 154 (an axis direction), which extends radially from the central piston axis that extends through the central portion of the movable piston 106.

Referring to the embodiment as depicted in FIG. 7, for the case where the stem connector 116 is movable closer to the central piston axis that extends through the central portion of the movable piston 106, the movable piston 106 may be less tilted (relative to the horizontal, for instance) or preferably not tilted, as depicted in the embodiments of FIG. 9 to FIG. 13.

Referring to the embodiment as depicted in FIG. 7, for the case where the stem connector 116 is moved away from the central piston axis that extends through the central portion of the movable piston 106, the movable piston 106 may be more tilted (relative to the horizontal, for instance), as depicted in the embodiments of FIG. 14 to FIG. 17.

Referring to the embodiment as depicted in FIG. 7, the stem connector 116 is configured to permit selective tilting of the movable piston 106 relative to the valve stem 110 at a predetermined tilt angle, so that the movable piston 106 may be moved (actuated for movement) while the stem connector 116 connects (maintains connection or is configured to maintain connection) between the movable piston 106 and the valve stem 110.

Figure 8:
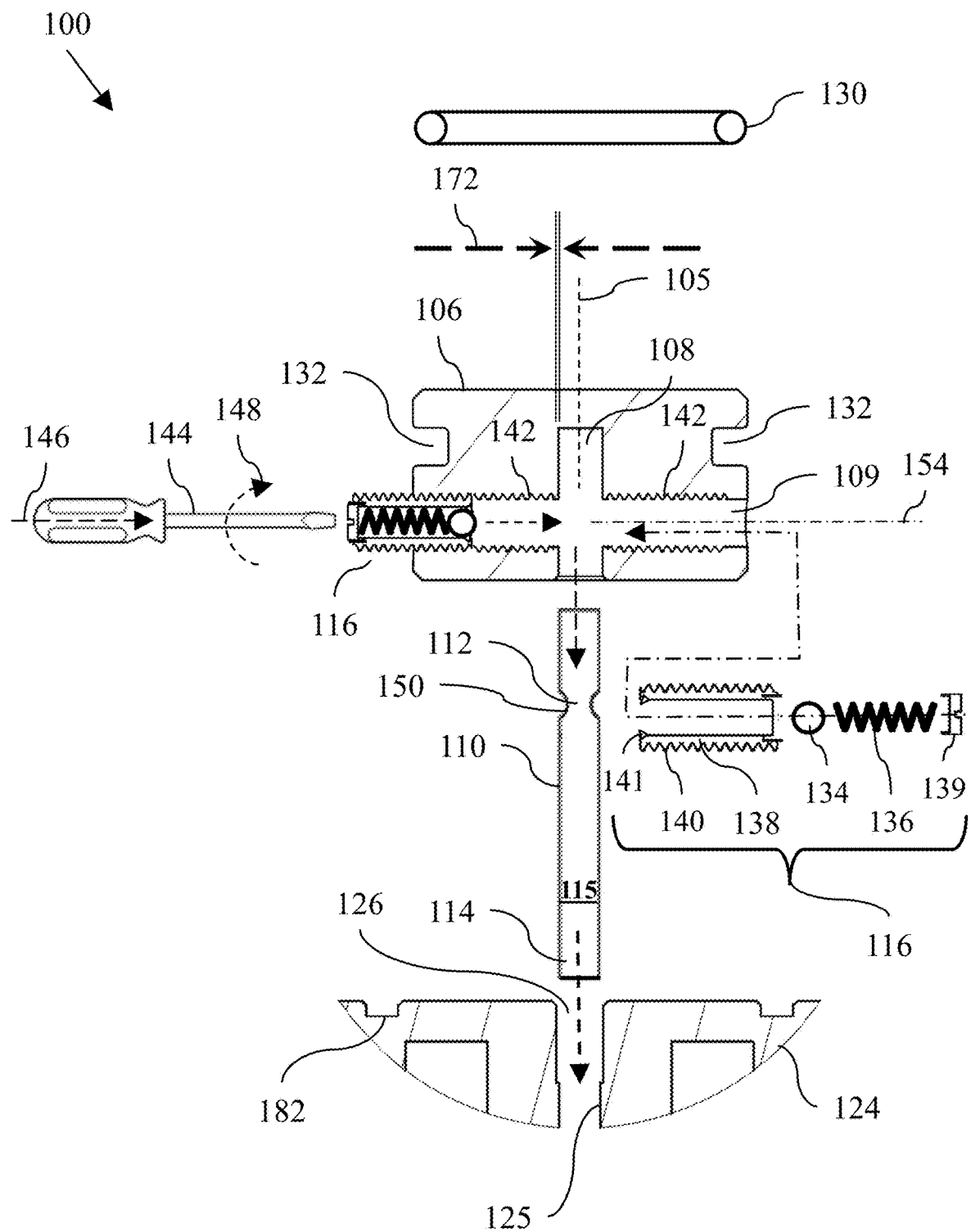
FIG. 8 depicts a cross-sectional side view of an embodiment of the movable piston of FIG. 6 (in which FIG. 8 depicts an exploded cross-sectional view taken through a cross-sectional line D-D of FIG. 7)

FIG. 8 depicts a cross-sectional side view (cross-sectional exploded view) of an embodiment of the movable piston 106 of FIG. 6. FIG. 8 depicts an exploded cross-sectional view taken through a cross-sectional line D-D of FIG. 7. The movable piston 106 is assembled with the valve stem 110.

Referring to the embodiment as depicted in FIG. 8, the stem connector 116 includes (and is not limited to) a synergistic combination of a housing assembly 138, a ball 134 (ball bearing), and a biasing device 136 (spring, biasing element). The housing assembly 138 provides (defines) threads 140 configured to threadably interact or couple with corresponding threads 142 provided or defined in the interior of the connector receiver 109 of the movable piston 106. The housing assembly 138 provides (defines) a hollow interior with openings positioned (located) at the opposite lateral end sections (also called a first end section and a second end section) of the housing assembly 138. The housing assembly 138 provides (defines) a chamfered circumferential edge 141 positioned at one of the openings of the hollow interior that is configured to face the valve stem 110. The first end section of the housing assembly 138 is configured to receive the ball 134, and then receive the biasing device 136. In this arrangement, the ball 134 and the biasing device 136 are received into the hollow interior of the housing assembly 138. The second end section of the housing assembly 138 has an opening (preferably, the opening is tapered) dimensioned to be smaller than an exterior diameter of the ball 134 (in this arrangement, the ball 134 and the biasing device 136 remain within in the interior of the housing assembly 138). A housing cover 139 is selectively connected (securely thread attached) to the first end section of the housing assembly 138 (once the ball 134 and the biasing device 136 are inserted into the interior of the housing assembly 138). The biasing device 136 abuts (contacts) the housing cover 139. The ball 134 abuts the second end section (or contacts the tapered end of the second end section) of the housing assembly 138 (once the housing cover 139 is attached to the first end section of the housing assembly 138). The stem connector 116 is threadably connected to the interior of the movable piston 106. The stem connector 116 is rotatably movable along a radial direction (such as the connector axis 154) extending radially from the central piston axis 105 of the movable piston 106. The valve stem 110 is inserted into the stem channel 126 of the stem bushing 124. The stem receiver 108 is provided by the movable piston 106, and is configured to receive one end of the valve stem 110.

Referring to the embodiment as depicted in FIG. 8, the seal assembly 130 is depicted in cross-section. The seal receiver 132 of the movable piston 106 is configured to receive the seal assembly 130. The seal receiver 132 is positioned along a peripheral outer surface of the movable piston 106.

Referring to the embodiment as depicted in FIG. 8, in the interior of the connector receiver 109, there is provided (formed) corresponding threads 142 for the interaction with the threads 140 of the stem connector 116.

Referring to the embodiment as depicted in FIG. 8, a tool 144 may be used to move the stem connector 116 along the connector axis 154 (along the linear direction 146). The tool 144 is rotated along a rotation direction 148, which then rotates the stem connector 116 accordingly.

Referring to the embodiment as depicted in FIG. 8, the valve stem 110 provides (defines) a stem groove 150 that is formed or positioned on the outer stem surface 115. The stem connector 116 is configured to contact, at least in part, the stem groove 150 of the valve stem 110. Preferably, the ball 134 of the stem connector 116 is configured to be received, at least in part, in the stem groove 150 of the valve stem 110. Preferably, the ball 134 contacts, at least in part, the stem groove 150 of the valve stem 110 (once the connector 116 is installed in the movable piston 106). The stem connector 116 (or more preferably, the ball 134 of the stem connector 116) is configured to be moved (to an extent, a degree, or a distance) within the stem groove 150 of the valve stem 110 (depending on the extent of rotation of the stem connector 116 within the movable piston 106).

Referring to the embodiment as depicted in FIG. 8, once the valve stem 110 is received into the stem receiver 108 of the movable piston 106, there is formed a stem-piston gap 172 (a gap clearance). The clearance is formed between the stem receiver 108 of the movable piston 106 and the valve stem 110. The clearance is formed between the interior of the movable piston 106 and the valve stem 110.

FIG. 9 to FIG. 13 depict cross-sectional side views of embodiments of the movable piston 106 of FIG. 4 (in which the movable piston 106 is not tilted relative to the valve stem 110).

Referring to the embodiments as depicted in FIG. 9 to FIG. 13, for the case where the stem connector 116 is movable closer to the central piston axis that extends through the central portion of the movable piston 106, the movable piston 106 may be less tilted (relative to the horizontal, for instance) or preferably not tilted, as depicted in the embodiments of FIG. 9 to FIG. 13.

Figure 9:
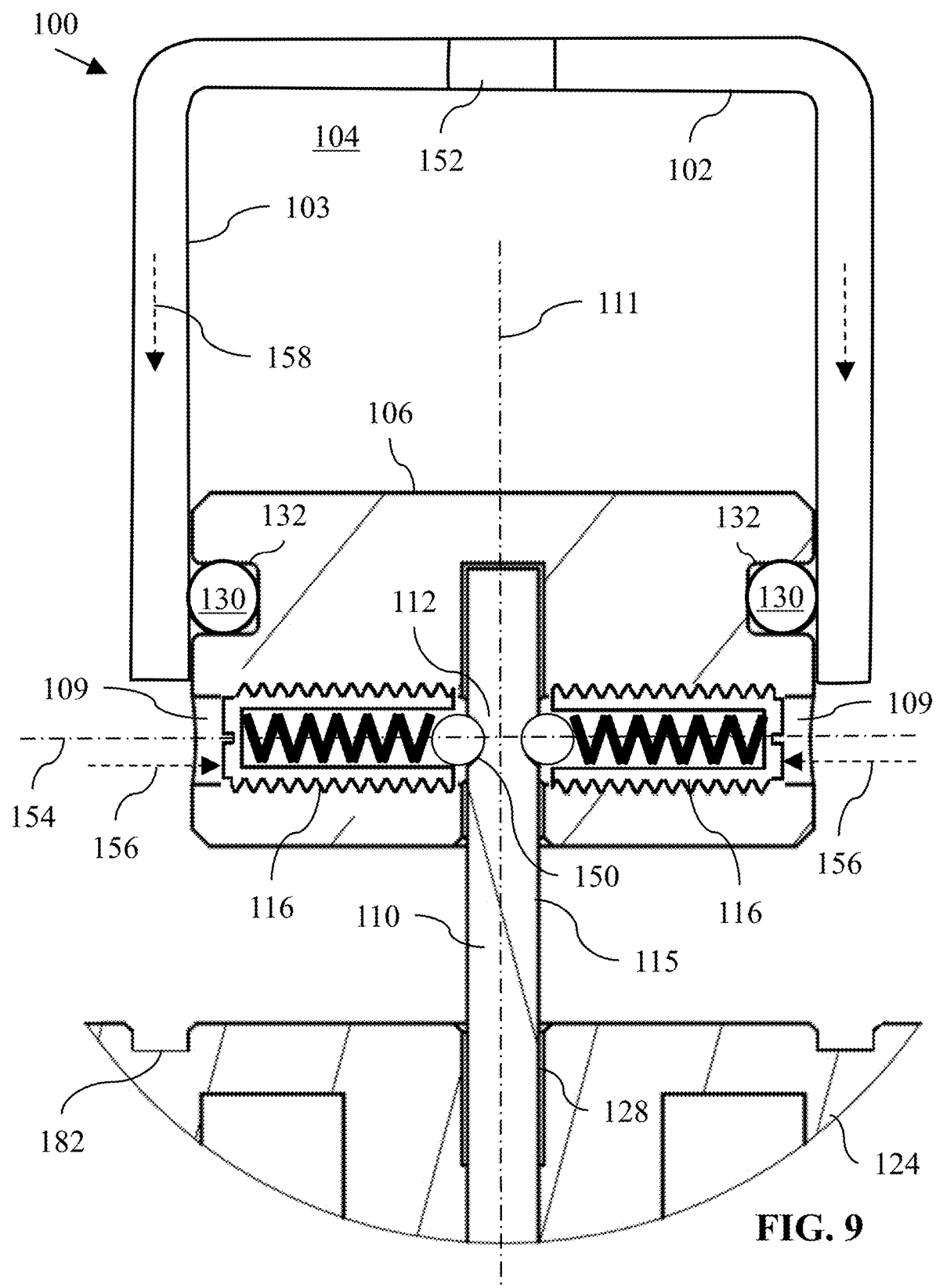
FIG. 9 to FIG. 13 depict cross-sectional side views of embodiments of the movable piston of FIG. 4 (in which the movable piston is not tilted relative to the valve stem)

Referring to the embodiment as depicted in FIG. 9, the cylinder 102 is inserted or installed over the movable piston 106. The cylinder 102 is moved along a cylinder direction 158. The cylinder 102 is installed to the cylinder receiver 182 of the stem bushing 124. The stem connector 116 is movable along the connector axis 154, and along a connector direction 156 (toward the first end portion 112 of the valve stem 110).

Figure 10:
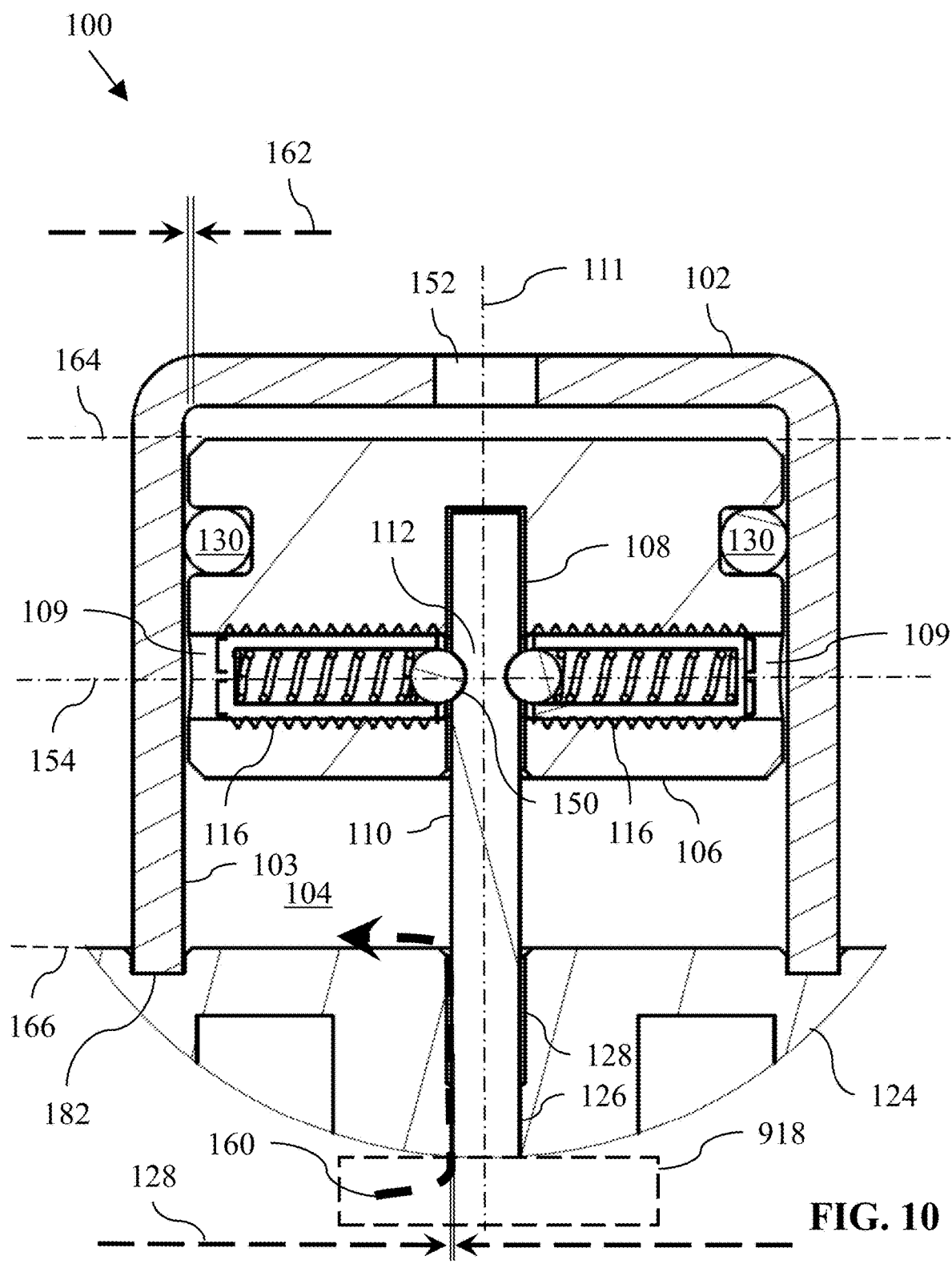

Referring to the embodiment as depicted in FIG. 10, the stem-bushing gap 128 is defined between an outer stem surface of the valve stem 110 and an inner bushing surface surrounding the stem channel 126 of the stem bushing 124. The movable piston 106 is reciprocated and, in response, the valve stem 110 is reciprocated (stroked or moved downward and upward) along the length of the stem channel 126. The valve stem 110 is reciprocated (stroked or moved downward and upward) along the stem channel 126 defined by the stem bushing 124. The outer stem surface of the valve stem 110 and the inner bushing surface surrounding the stem channel 126 of the stem bushing 124 are slidable relative to each other while the outer stem surface of the valve stem 110 and the inner bushing surface of the stem bushing 124 face each other. The outer piston surface of the movable piston 106 and the inner surface 103 of the cylinder 102 are slidable relative to each other while the outer piston surface of the movable piston 106 and the inner surface 103 of the cylinder 102 face each other.

Referring to the embodiment as depicted in FIG. 10, a stem-bushing gap 128 is formed between the outer surface of the valve stem 110 and the inner surface of the stem bushing 124 surrounding the outer surface of the valve stem 110. Unwanted leakage of the molding material may be expected along a molding-material flow direction 160 (depending on the size of the stem-bushing gap 128).

Figure 15:
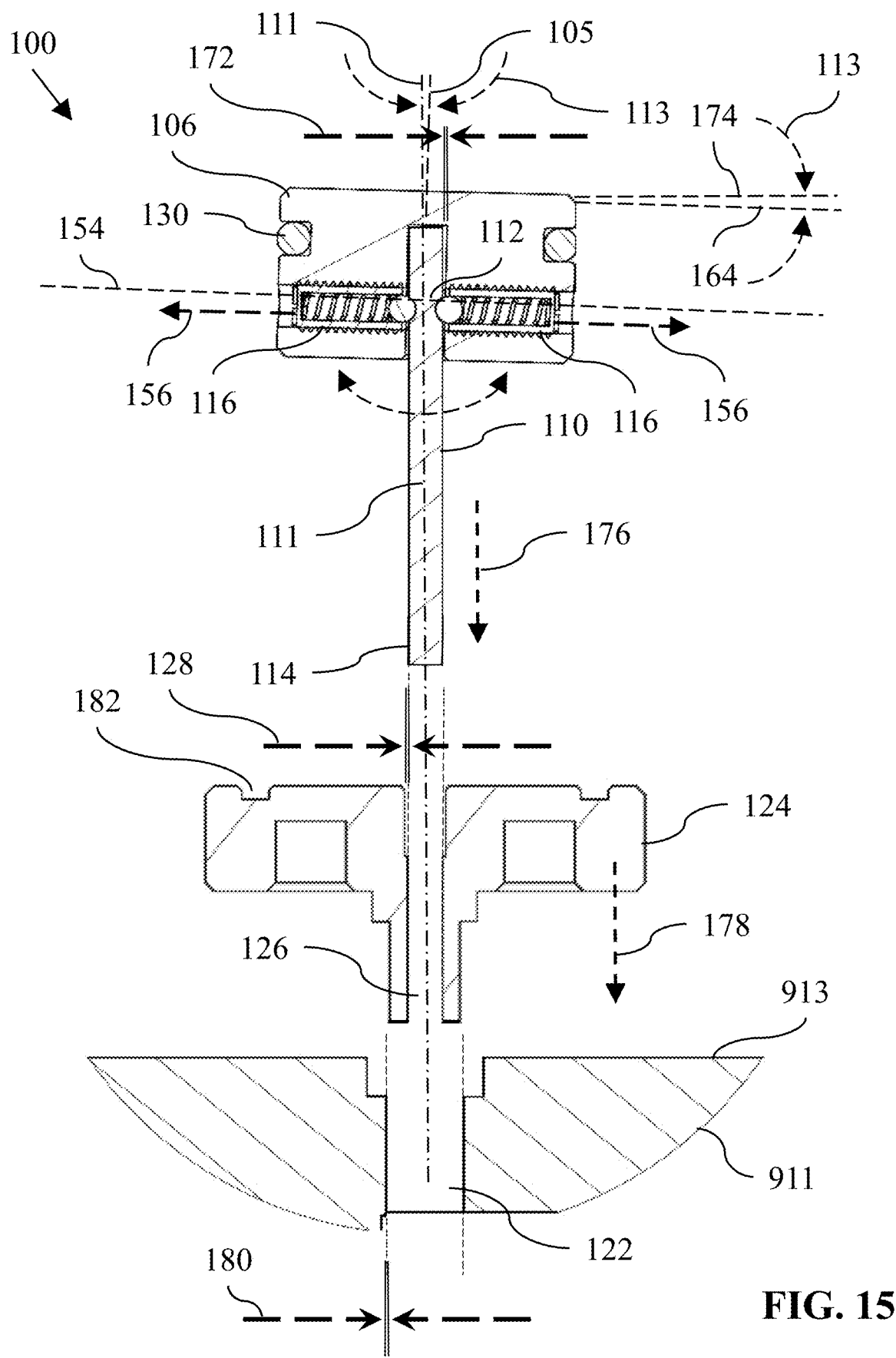

Referring to the embodiment as depicted in FIG. 10, a piston-cylinder gap 162 is formed between the outer lateral side surface (outer peripheral surface) of the movable piston 106 and the inner surface 103 (interior surface) of the cylinder 102. The amount of tilt of the movable piston 106 may be adjusted by moving the position of the stem connector 116 closer to the first end portion 112 of the valve stem 110, or by moving the position of the stem connector 116 further away from the first end portion 112 of the valve stem 110. The piston alignment plane 164 is defined by a top surface of the movable piston 106. The bushing alignment plane 166 is defined by a top surface of the stem bushing 124. The stem connector 116 may be moved within the interior of the movable piston 106 such that the piston alignment plane 164 and the bushing alignment plane 166 may be tilted relative to each other (as depicted in FIG. 15), or may be held parallel to each other (as depicted in FIG. 10).

Figure 11:
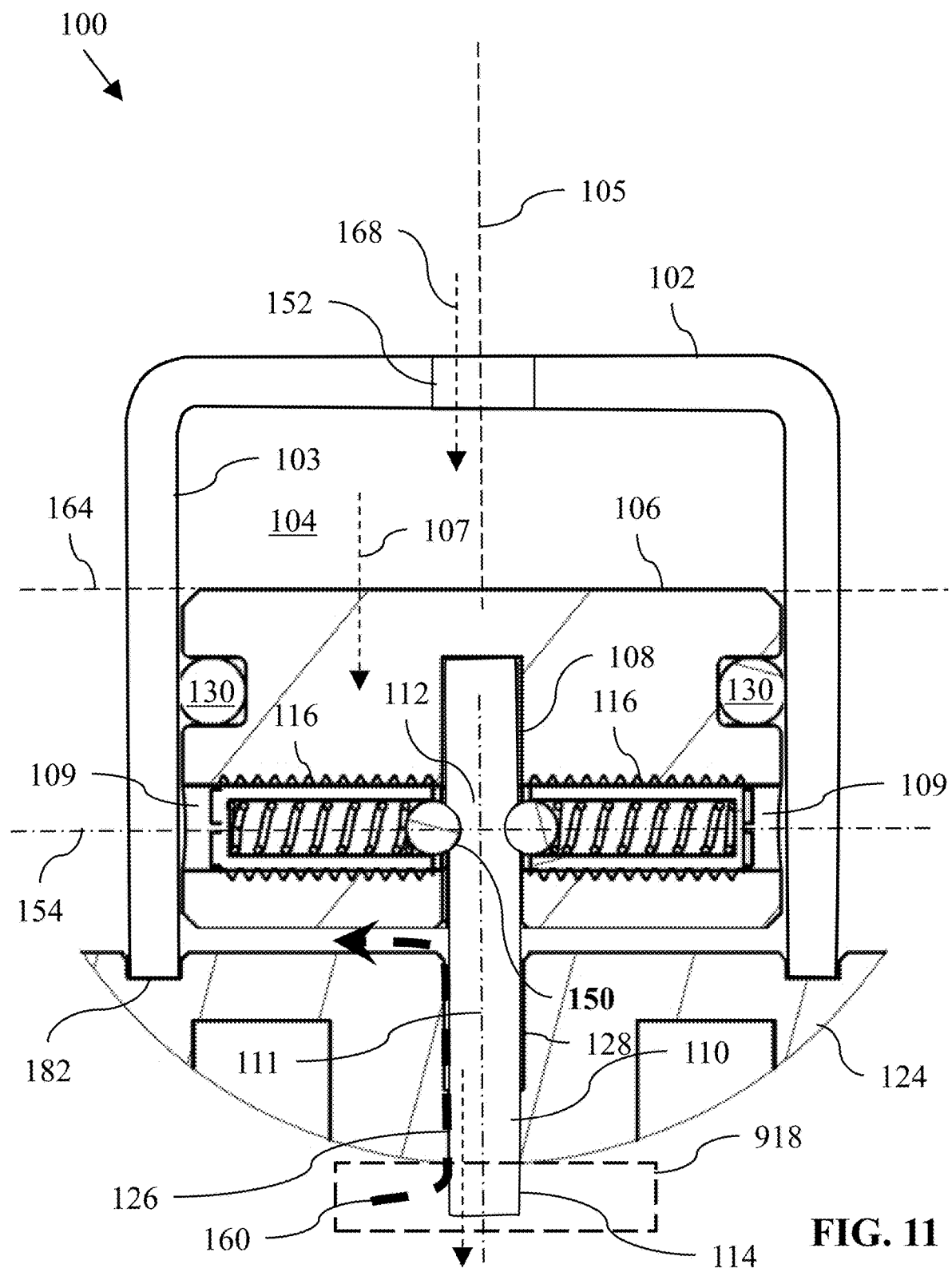

Referring to the embodiment as depicted in FIG. 11, an activation force 107 is initiated by utilizing a fluid-flow direction 168 (a flow of actuated air). The activation force 107 urges the movable piston 106 to move toward the stem bushing 124 so that the valve stem 110 may be moved so that the molding material may not flow into the interior of the mold assembly 918.

Figure 12:
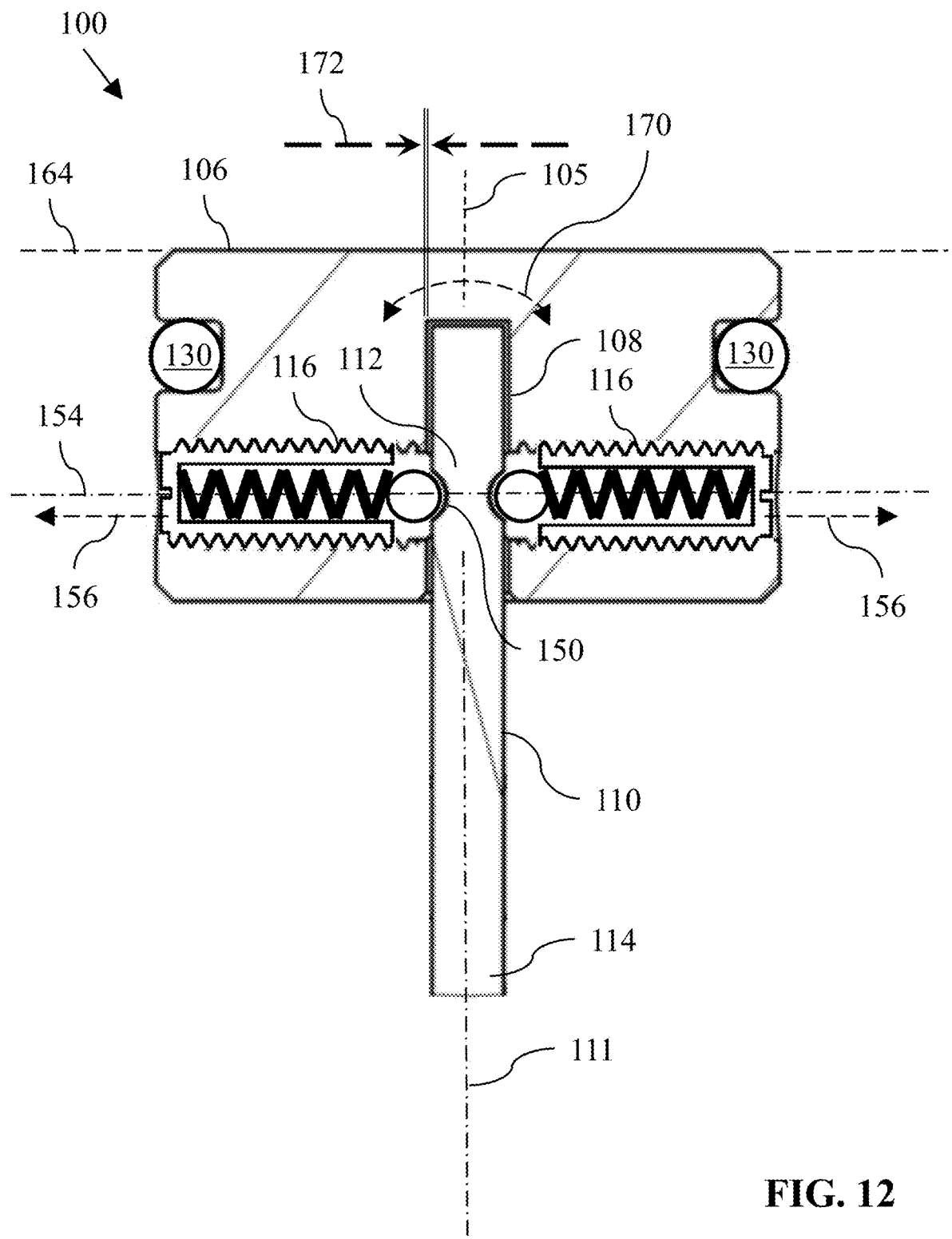

Referring to the embodiment as depicted in FIG. 12, the stem connector 116 may be selectively moved or repositioned within the interior of the movable piston 106. In this manner, the movable piston 106 is rotated or tiled via a rotation direction 170. The amount of tilt of the movable piston 106 depends on the position of the stem connector 116 within the interior of the movable piston 106. The extent of the amount of tilt of the movable piston 106 depends on the size of the stem-piston gap 172. The stem-piston gap 172 is formed between the outer surface of the valve stem 110 and the interior surface of the movable piston 106 (located in the stem receiver 108).

Figure 13:
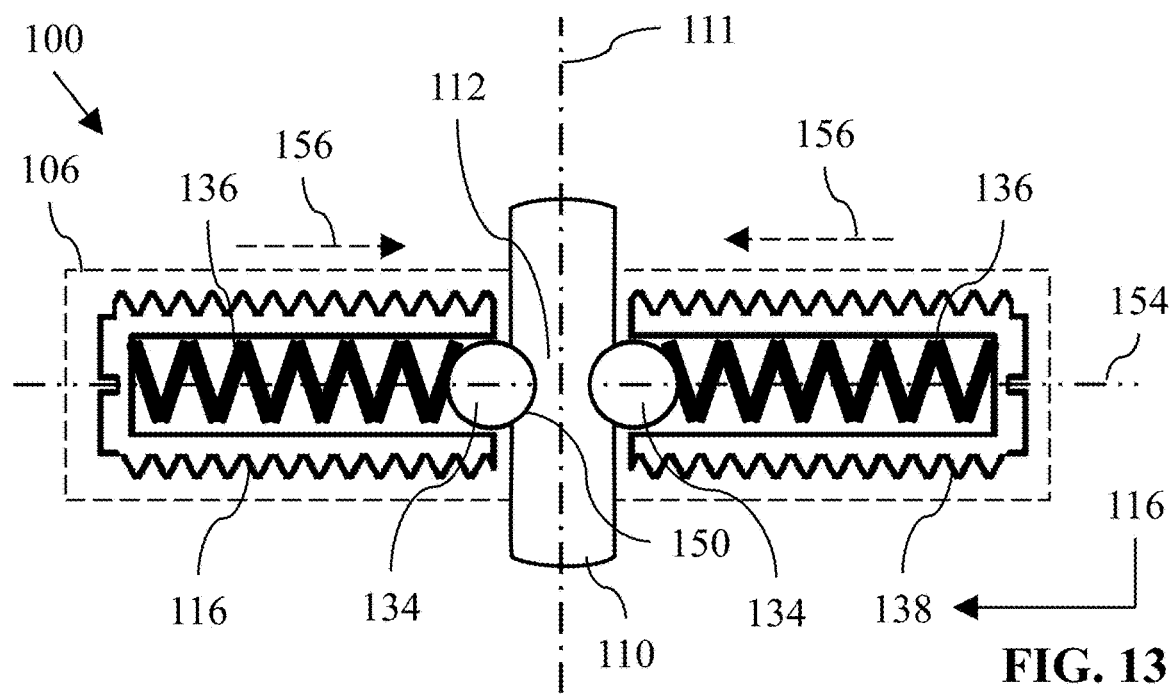

Referring to the embodiment as depicted in FIG. 13, there is depicted a close-up view of the stem connector 116. The ball 134 of the stem connector 116 is positioned relative to the stem groove 150 of the valve stem 110. As depicted, the ball 134 of the stem connector 116 closely abuts (contacts) the entirety (preferably) of the stem groove 150 of the valve stem 110 (in a close positioned relationship), in which the movable piston 106 is positioned in a non-tilted relationship relative to the alignment of the valve stem 110. The stem groove 150 is formed in the first end portion 112 of the valve stem 110.

FIG. 14 to FIG. 17 depict cross-sectional side views of embodiments of the movable piston 106 of FIG. 4 (in which the movable piston 106 is tilted relative to the valve stem 110).

Figure 14:
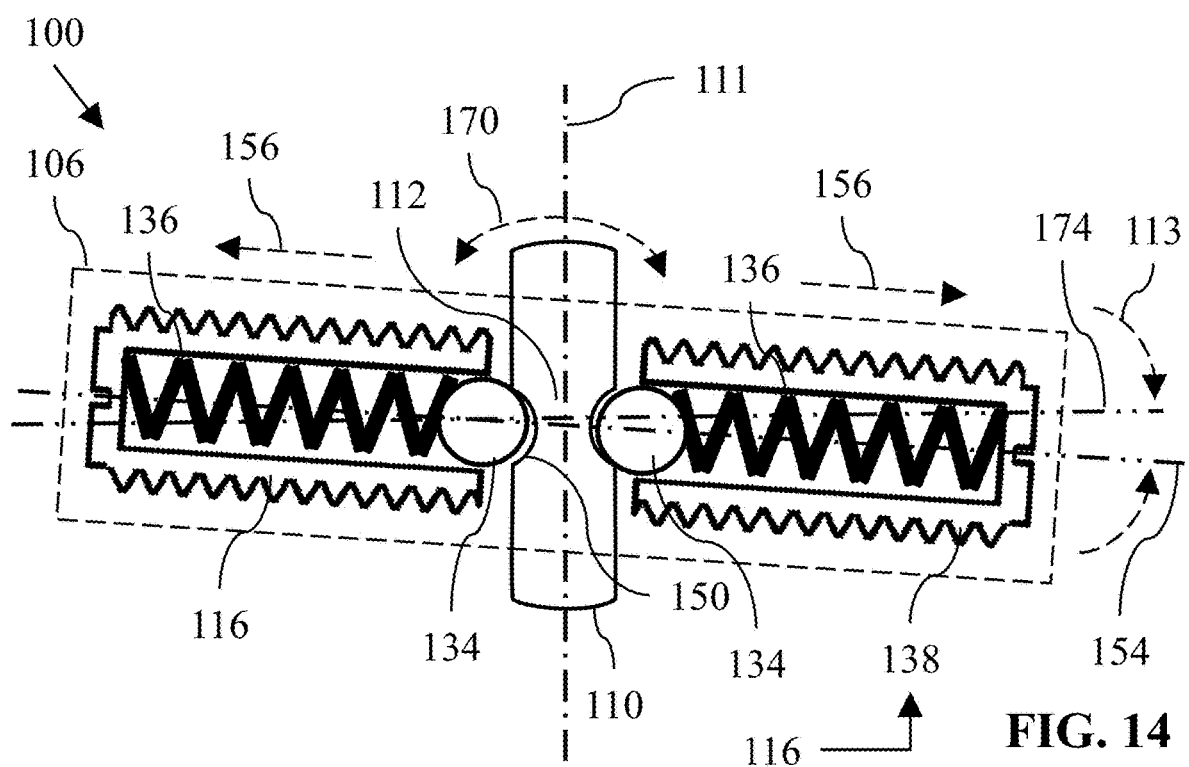
FIG. 14 to FIG. 17 depict cross-sectional side views of embodiments of the movable piston of FIG. 4 (in which the movable piston is tilted relative to the valve stem).

Referring to the embodiment as depicted in FIG. 14, for the case where the stem connector 116 are moved away from the central piston axis that extends through a central portion of the movable piston 106, the movable piston 106 may be more tilted (relative to the horizontal, for instance), as depicted in the embodiments of FIG. 14 to FIG. 17.

Referring to the embodiment as depicted in FIG. 14, there is depicted a close-up view of the stem connector 116. The ball 134 of the stem connector 116 is positioned relative to the stem groove 150 of the valve stem 110. As depicted, the ball 134 of the stem connector 116 loosely abuts (loosely contacts) the stem groove 150 of the valve stem 110, in which the movable piston 106 is positioned in a tilted relationship relative to the alignment of the valve stem 110. The stem groove 150 is formed in the first end portion 112 of the valve stem 110. The technical advantage is that the stem connector 116 may permit the stem-bushing gap 128 (as depicted in FIG. 10) to remain as tight as possible so that the amount of unwanted flow of molding material along the molding-material flow direction 160 is kept or maintained to a minimum (preferably, no flow if possible). The connector axis 154 is aligned at a tilt angle 113 relative to the horizontal 174 (also called the horizon), which may be aligned orthogonally to the central stem axis 111 of the valve stem 110.

Referring to the embodiment as depicted in FIG. 15, the movable piston 106 is depicted in a titled state or orientation while the stem connector 116 connects the movable piston 106 to the valve stem 110. The valve stem 110 is inserted into the stem channel 126 of the stem bushing 124 via a first insertion direction 176. The stem bushing 124 is inserted into the bushing channel 122 of the distribution manifold 911 via a second direction 178. The stem-bushing gap 128 is located between the valve stem 110 and the stem bushing 124. The bushing-manifold gap 180 is located between the stem bushing 124 and the interior of the distribution manifold 911. The cylinder receiver 182 is provided by the stem bushing 124, and the cylinder receiver 182 is configured to receive the outer edge portion of the cylinder 102 (at an opening mouth of the cylinder 102).

Figure 16:
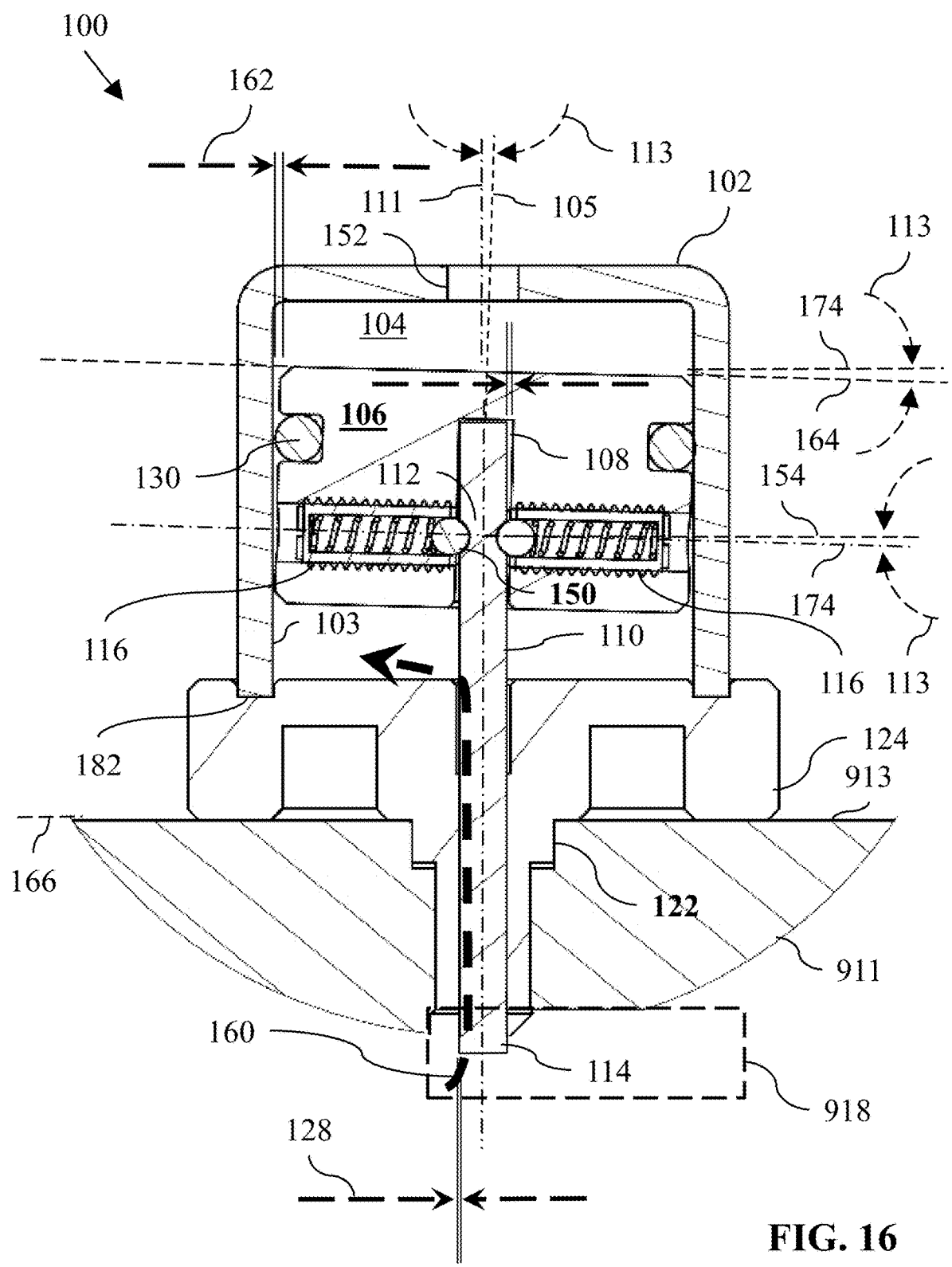

Referring to the embodiment as depicted in FIG. 16, the stem-bushing gap 128 is formed between the outer surface of the valve stem 110 and the inner surface of the stem bushing 124. The stem connector 116 connects the valve stem 110 to the movable piston 106 so that a tight guidance may be maintained between the valve stem 110 and the stem bushing 124. The movable piston 106 is permitted to remain tilted while the movable piston 106, in use, reciprocates (up and down as result of selective activation of air flow into and out of (from) the interior of the cylinder 102).

Figure 17:
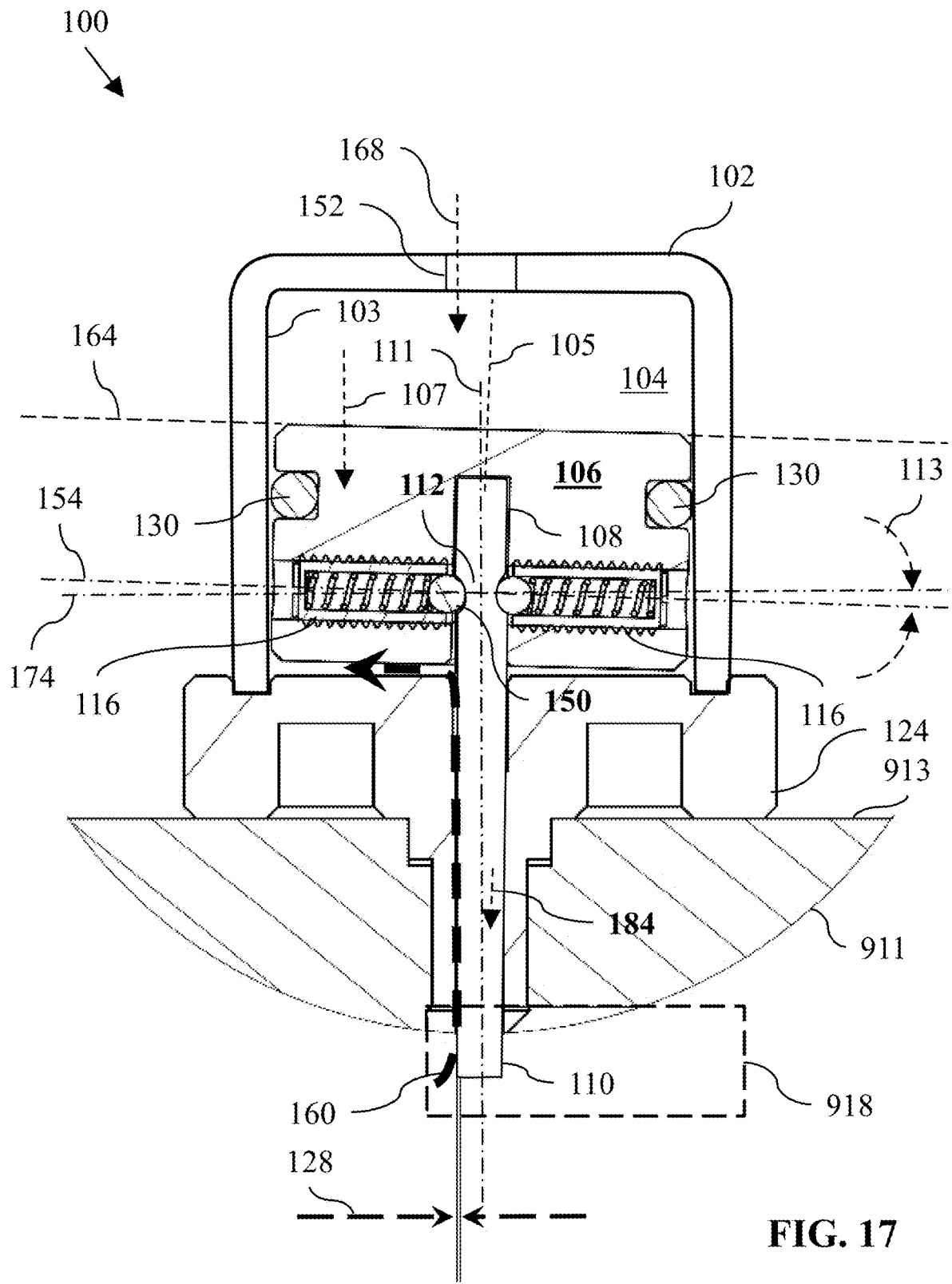

Referring to the embodiment as depicted in FIG. 17, the activation force 107 is applied to the movable piston 106, and, as a result, the valve stem 110 is movable along the stem direction 184. As air pressure is applied to the movable piston 106, the valve stem 110 is stroked (moved) downwards and upwards (reciprocates) to close (by downward movement of the valve stem 110) or open (by upward movement of the valve stem 110) the mold gate of the mold assembly 918. While the valve stem 110 is moved, there are sliding surfaces as follows: (A) a first set of slide surfaces located between the cylinder 102 and the movable piston 106, and (B) a second set of slide surfaces located between the valve stem 110 and the stem bushing 124. The stem connector 116 permits the reduction (preferably, the avoidance) of wear between the valve stem 110 and the stem bushing 124, and thereby reduce (preferably, prevent) the leakage of flowable molding material (plastic leakage) from travelling along the second set of slide surfaces located between the valve stem 110 and the stem bushing 124 (from travelling along the stem-bushing gap 128).

Referring to the embodiment as depicted in FIG. 17, it will be appreciated that it is preferred to have the valve stem 110 move perfectly vertically (within given tolerance); however, this ideal case may not be realized, and there are manufacturing tolerances and clearances, and uneven air pressure, which may require the tilting of the movable piston 106 by the stem connector 116. The stem connector 116 allows for the movable piston 106 to be tilted and to thereby keep the interface between the valve stem 110 and the stem bushing 124 as vertically as possible (within tolerance) and thereby reduce the possibility of (preferably, prevent) wear between these surfaces.

Referring to the embodiment as depicted in FIG. 17, there may be a larger variable tolerance located between the movable piston 106 and the interior wall of the cylinder 102. It is preferred to maintain the tolerance between the valve stem 110 and the stem bushing 124 as small and tight as possible (to prevented leakage of flowable molding material into the interior of the cylinder 102). Leakage of the molding material into the interior of the cylinder 102 may cause the movable piston 106 to stop moving, thus leading to unwanted or premature shut down of the molding system 900 (as depicted in FIG. 1). The stem connector 116 is useful as it reduces the possibility of wear of surfaces between the valve stem 110 and the stem bushing 124, and/or reduces the opportunity for leakage of plastic molding material into the interior of the cylinder 102.

Referring to the embodiment as depicted in FIG. 17, the stem connector 116 selectively connects (is configured to connect) the valve stem 110 to the movable piston 106. The stem connector 116 allows for the movable piston 106 to be rotated (tilted) while the movable piston 106 is received in the cylinder 102. The valve stem 110 and the stem bushing 124 remain coaxially aligned with each other while the movable piston 106 is received in the cylinder 102 so that wear is reduced between the outer stem surface of the valve stem 110 and an inner bushing surface 125 surrounding the outer stem surface 115 of the stem channel 126 of the stem bushing 124 while the valve stem 110 is reciprocated along the stem channel 126. The stem connector 116 permits a larger variable tolerance between the movable piston 106 and the cylinder 102. The tolerance between the valve stem 110 and the stem bushing 124 is preferred to be relatively as tight as possible (thereby reducing the wear between surfaces of the valve stem 110 and the stem bushing 124, and reducing the possibility of leakage of plastic molding material between these surfaces and into the interior of the cylinder 102).

Referring to the embodiment as depicted in FIG. 3 to FIG. 17, the apparatus 100 includes and is not limited to (comprises) a melt-distribution assembly 910 for the molding system 900 (as depicted in FIG. 1). The melt-distribution assembly 910 is for installation in (with) the molding system 900. The melt-distribution assembly 910 includes, for instance, (is also called) a runner assembly. The melt-distribution assembly 910 is securely mounted (securely mountable) to the first platen 906 of the clamp assembly 904 of the molding system 900. The melt-distribution assembly 910 includes and is not limited to (comprises) a synergistic combination of a distribution manifold 911, a cylinder 102, a movable piston 106, a valve stem 110, and a stem connector 116.

Referring to the embodiment as depicted in FIG. 3 to FIG. 17, the cylinder 102 has an interior 104. The cylinder 102 is mounted to a manifold exterior 913 of the distribution manifold 911.

Referring to the embodiment as depicted in FIG. 3 to FIG. 17, the movable piston 106 is slidably receivable in the interior 104 of the cylinder 102, and the movable piston 106 is movable within the interior 104 of the cylinder 102 in response to an application of an activation force 107 (also called air pressure) acting on the movable piston 106, and the movable piston 106 defining a stem receiver 108.

Referring to the embodiment as depicted in FIG. 3 to FIG. 17, the valve stem 110 has a first end portion 112 that is slidably inserted into the stem receiver 108 of the movable piston 106. The valve stem 110 extends from the movable piston 106 once the first end portion 112 of the valve stem 110 is inserted into the stem receiver 108. The valve stem 110 has a second end portion 114 that is slidably insertable, at least in part, in (into) the mold gate 914 of the melt-distribution assembly 910. The second end portion 114 of the valve stem 110 is sized to close the mold gate 914 once the valve stem 110 is slidably inserted, at least in part, in (into) the mold gate 914. The second end portion 114 of the valve stem 110 is sized to open (selectively open) the mold gate 914 once the valve stem 110 is slidably removed from the mold gate 914.

Referring to the embodiment as depicted in FIG. 3 to FIG. 17, the stem connector 116 is mounted to an interior of the movable piston 106. The stem connector 116 may be called a detent mechanism. The stem connector 116 is for connecting the movable piston 106 with (and) the first end portion 112 of the valve stem 110. The valve stem 110 is received in the stem receiver 108 of the movable piston 106. The stem connector 116 maintains connection (the stem connector is configured to maintain connection) between the movable piston 106 with (and) the first end portion 112 of the valve stem 110 while the valve stem 110 is moved to selectively open or close the mold gate 914 in response to the movable piston 106 selectively receiving the activation force 107. The stem connector 116 maintains the movable piston 106 to tilt at a tilt angle 113. The stem connector 116 urges (maintains) the movable piston 106 to tilt at the tilt angle 113 while the movable piston 106 is moved along the interior 104 of the cylinder 102. The tilt angle 113 is formed between a central piston axis 105 extending through the movable piston 106 and a central stem axis 111 extending through the valve stem 110. A technical effect is a reduction in (preferably, avoidance of) surface wear between the outer stem surface of the valve stem 110 and the inner bushing surface surrounding the stem channel 126 of a stem bushing 124 to thereby reduce (preferably, prevent) leakage of the flowable molding material from the melt-distribution channel 916 and along the stem channel 126 of the stem bushing 124 toward the interior of the cylinder 102. The valve stem 110 is reciprocated but there are factors (manufacturing tolerances, clearances, uneven air pressure in the cylinder 102) which may require the central piston axis 105 of the movable piston 106 to be tilted away from the central stem axis 111 of the valve stem 110.

The following is offered as further description of the embodiments, in which any one or more of any technical feature (described in the detailed description, the summary and the claims) may be combinable with any other one or more of any technical feature (described in the detailed description, the summary and the claims). It is understood that each claim in the claims section is an open ended claim unless stated otherwise. Unless otherwise specified, relational terms used in these specifications should be construed to include certain tolerances that the person skilled in the art would recognize as providing equivalent functionality. By way of example, the term perpendicular is not necessarily limited to 90.0 degrees, and may include a variation thereof that the person skilled in the art would recognize as providing equivalent functionality for the purposes described for the relevant member or element. Terms such as "about" and "substantially", in the context of configuration, relate generally to disposition, location, or configuration that are either exact or sufficiently close to the location, disposition, or configuration of the relevant element to preserve operability of the element within the invention which does not materially modify the invention. Similarly, unless specifically made clear from its context, numerical values should be construed to include certain tolerances that the person skilled in the art would recognize as having negligible importance as they do not materially change the operability of the invention. It will be appreciated that the description and/or drawings identify and describe embodiments of the apparatus (either explicitly or inherently). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that the technical features of each embodiment may be deployed (where possible) in other embodiments even if not expressly stated as such above. It will be appreciated that persons skilled in the art would know that other options would be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the word "includes" is equivalent to the word "comprising" in that both words are used to signify an open-ended listing of assemblies, components, parts, etc. The term "comprising", which is synonymous with the terms "including," "containing," or "characterized by," is inclusive or open-ended and does not exclude additional, unrecited elements or method steps. Comprising (comprised of) is an "open" phrase and allows coverage of technologies that employ additional, unrecited elements. When used in a claim, the word "comprising" is the transitory verb (transitional term) that separates the preamble of the claim from the technical features of the invention. The foregoing has outlined the non-limiting embodiments (examples). The description is made for particular non-limiting embodiments (examples). It is understood that the non-limiting embodiments are merely illustrative as examples.

What is claimed is:

1. An apparatus, comprising:
   a stem connector configured to connect a movable piston and a valve stem, in which the movable piston is slidably receivable in a cylinder, and in which the cylinder is mountable to a distribution manifold of a molding system; and
   the stem connector maintaining connection between the movable piston and the valve stem while the valve stem is moved to selectively open or close a mold gate of a mold assembly installed in the molding system; and
   the stem connector urging the movable piston to tilt at a tilt angle while the movable piston is moved along an interior of the cylinder, and in which the tilt angle is formed between a central piston axis extending through the movable piston and a central stem axis extending through the valve stem.

2. The apparatus of claim 1, wherein:
the stem connector is configured to permit movement of the valve stem along with the movable piston while reducing undesired friction and wear between an outer surface of the valve stem and an adjacently-located surface of a component.

3. The apparatus of claim 1, wherein:
the movable piston includes a connector receiver; and
the connector receiver is radially aligned relative to the central piston axis of the movable piston; and
the connector receiver extends radially from the central piston axis of the movable piston; and
the connector receiver extends along a connector axis; and
the connector receiver is configured to receive, at least in part, the stem connector.

4. The apparatus of claim 3, wherein:
the connector receiver forms a corresponding shape that corresponds to an exterior shape of the stem connector.

5. The apparatus of claim 1, wherein:
the stem connector includes:
a first stem connector; and
a second stem connector; and
a third stem connector; and
a fourth stem connector; and
the movable piston includes:
a first connector receiver configured to receive the first stem connector; and
a second connector receiver configured to receive the second stem connector; and
a third connector receiver configured to receive the third stem connector; and
a fourth connector receiver configured to receive the fourth stem connector; and
the first connector receiver, the second connector receiver, the third connector receiver and the fourth connector receiver each radially extend, at respective angles, from the central piston axis of the movable piston.

6. The apparatus of claim 1, wherein:
an outer surface of the valve stem and an interior surface surrounding a stem channel of a stem bushing are made to move relative to each other once the movable piston is actuated for movement; and
the stem connector is configured to maintain a tight guidance between the outer surface of the valve stem and the interior surface surrounding the stem channel of the stem bushing, thereby reducing wear between the outer surface of the valve stem and the interior surface surrounding the stem channel of the stem bushing.

7. The apparatus of claim 1, wherein:
the stem connector is configured to be rotatably movable along a connector axis that extends radially from the central piston axis that extends through a central portion of the movable piston.

8. The apparatus of claim 1, wherein:
the movable piston is less tilted once the stem connector is movable closer to the central piston axis that extends through a central portion of the movable piston; and
the movable piston is more tilted once the stem connector is moved away from the central piston axis that extends through the central portion of the movable piston.

9. The apparatus of claim 1, wherein:
the stem connector is configured to permit selective tilting of the movable piston relative to the valve stem at the tilt angle, so that the movable piston is movable while the stem connector maintains connection between the movable piston and the valve stem.

10. The apparatus of claim 1, wherein:
the stem connector includes:
a housing assembly; and
a ball; and
a biasing device; and
wherein:
the housing assembly provides threads configured to threadably interact with corresponding threads provided in an interior of a connector receiver of the movable piston; and
the housing assembly provides a hollow interior with openings positioned a first end section and a second end section; and
the first end section of the housing assembly is configured to receive the ball, and then receive the biasing device; and
the second end section of the housing assembly has an opening dimensioned to be smaller than an exterior diameter of the ball so that the ball and the biasing device remain within in the interior of the housing assembly; and
a housing cover is selectively connected to the first end section of the housing assembly once the ball and the biasing device are inserted into the interior of the housing assembly; and
the biasing device abuts the housing cover, and the ball abuts the second end section of the housing assembly once the housing cover is attached to the first end section of the housing assembly.

11. The apparatus of claim 1, wherein:
the stem connector is threadably connected to an interior of the movable piston; and
the stem connector is rotatably movable along a radial direction extending radially from the central piston axis of the movable piston.

12. The apparatus of claim 1, wherein:
the stem connector is rotatably movable along a connector axis along an interior of the movable piston by a tool.

13. The apparatus of claim 1, wherein:
the valve stem provides a stem groove formed on an outer stem surface of the valve stem; and
the stem connector is configured to be moved to an extent within the stem groove of the valve stem depending on an extent of rotation of the stem connector within the movable piston.

14. The apparatus of claim 1, wherein:
an amount of tilt of the movable piston is adjusted by moving the stem connector closer to the valve stem, or by moving the stem connector further away from the valve stem.

15. The apparatus of claim 1, wherein:
the stem connector is movable within an interior of the movable piston, and the movable piston becomes tilted via a rotation direction such that a piston alignment plane and a bushing alignment plane are tilted relative to each other; and
the piston alignment plane is defined by a surface of the movable piston; and the
bushing alignment plane is defined by a surface of a stem bushing; and
an amount of tilt of the movable piston depends on a position of the stem connector within the interior of the movable piston.

16. The apparatus of claim 1, wherein:
a stem-bushing gap is formed between an outer surface of the valve stem and an inner surface of a stem bushing; and
the stem connector permits the stem-bushing gap to remain as tight as possible so that an amount of unwanted flow of molding material along a molding-material flow direction is reduced.

17. The apparatus of claim 1, wherein:
a stem-bushing gap is formed between an outer surface of the valve stem and an inner surface of a stem bushing; and
the stem connector connects the valve stem to the movable piston so that a tight guidance is maintained between the valve stem and the stem bushing; and
the movable piston is permitted to remain tilted while the movable piston, in use, reciprocates.

18. The apparatus of claim 1, wherein:
the valve stem and a stem bushing remain coaxially aligned with each other while the movable piston is received in the cylinder so that wear is reduced between an outer stem surface of the valve stem and an inner bushing surface surrounding the outer stem surface of a stem channel of the stem bushing while the valve stem is reciprocated along the stem channel.

19. An apparatus, comprising:
a melt-distribution assembly for installation in a molding system; and
the melt-distribution assembly, including:
  a distribution manifold; and
  a cylinder having an interior, and the cylinder mounted to a manifold exterior of the distribution manifold, and the melt-distribution assembly including a mold gate; and
  a movable piston slidably receivable in the interior of the cylinder, and the movable piston is movable within the interior of the cylinder in response to an application of an activation force acting on the movable piston, and the movable piston defining a stem receiver; and
  a valve stem having a first end portion slidably inserted into the stem receiver of the movable piston, and the valve stem extending from the movable piston once the first end portion of the valve stem is inserted into the stem receiver, and
  the valve stem having a second end portion that is slidably insertable, at least in part, into the mold gate of the melt-distribution assembly, and the second end portion of the valve stem sized to close the mold gate once the valve stem is slidably inserted, at least in part into the mold gate, and the second end portion of the valve stem sized to open the mold gate once the valve stem is slidably removed from the mold gate; and
  a stem connector being mounted to an interior of the movable piston, and the stem connector for connecting the movable piston and the first end portion of the valve stem received in the stem receiver of the movable piston; and
  the stem connector maintaining connection between the movable piston and the first end portion of the valve stem while the valve stem is moved to selectively open or close the mold gate in response to the movable piston selectively receiving the activation force; and
  the stem connector urging the movable piston to tilt at a tilt angle while the movable piston is moved along the interior of the cylinder, and in which the tilt angle is formed between a central piston axis extending through the movable piston and a central stem axis extending through the valve stem.

20. An apparatus, comprising:
a molding system, including:
  an injection assembly for preparing and providing a flowable molding material; and
  a clamp assembly spaced apart from the injection assembly; and
  the clamp assembly including a first platen; and
  the clamp assembly including a second platen, in which the first platen and the second platen are movable relative to each other; and
  a melt-distribution assembly securely mounted to the first platen of the clamp assembly of the molding system; and
  the melt-distribution assembly, including a distribution manifold providing:
    a sprue for fluidly receiving the flowable molding material from the injection assembly; and
    a melt-distribution channel fluidly extending from the sprue; and
  a mold assembly providing a mold gate for fluidly communicating with the melt-distribution channel, and the mold assembly also providing a mold cavity for receiving the flowable molding material from the mold gate via the melt-distribution channel of the melt-distribution assembly; and
  the mold assembly having a first mold section securely mounted to the melt-distribution assembly; and
  the mold assembly also having a second mold section securely mounted to the second platen of the clamp assembly; and
  the first mold section and the second mold section are movable relative to each other in response to relative movement between the first platen and the second platen; and
the melt-distribution assembly also including:
  a cylinder having an interior, and the cylinder mounted to a manifold exterior of the distribution manifold; and
  a movable piston slidably receivable in the interior of the cylinder, and the movable piston is movable within the interior of the cylinder in response to an application of an activation force acting on the movable piston, and the movable piston defining a stem receiver; and
  a valve stem having a first end portion slidably inserted into the stem receiver of the movable piston, and the valve stem extending from the movable piston once the first end portion of the valve stem is inserted into the stem receiver, and
  the valve stem having a second end portion being slidably insertable, at least in part, into the mold gate of the melt-distribution assembly, and the second end portion of the valve stem sized to close the mold gate once the valve stem is slidably inserted, at least in part, into the mold gate, and the second end portion of the valve stem sized to open the mold gate once the valve stem is slidably removed from the mold gate; and
  a stem connector mounted to an interior of the movable piston, and the stem connector for connecting the movable piston and the first end portion of the valve stem received in the stem receiver of the movable piston; and the stem connector maintaining connection between the movable piston and the first end portion of the valve stem while the valve stem is moved to selectively open or close the mold gate in response to the movable piston selectively receiving the activation force; and the stem connector urging the movable piston to tilt at a tilt angle while the movable piston is moved along the interior of the cylinder, and in which the tilt angle is formed between a central piston axis extending through the movable piston and a central stem axis extending through the valve stem.

\* \* \* \* \*